United States Patent [19]
Yano et al.

[11] Patent Number: 6,050,669
[45] Date of Patent: *Apr. 18, 2000

[54] METHOD OF CONTROLLING AN INK-JET RECORDING APPARATUS ACCORDING TO RECORDING APPARATUS IN WHICH THE METHOD IS IMPLEMENTED

[75] Inventors: Kentaro Yano, Yokohama; Naoji Otsuka, Kawasaki; Shigeyasu Nagoshi, Kawasaki; Atsushi Arai, Kawasaki; Kiichiro Takahashi, Yokohama; Osamu Iwasaki, Tokyo, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/925,139

[22] Filed: Sep. 8, 1997

Related U.S. Application Data

[63] Continuation of application No. 07/992,294, Dec. 16, 1992, abandoned.

[30] Foreign Application Priority Data

Dec. 19, 1991 [JP] Japan ................................. 3-336928
Dec. 19, 1991 [JP] Japan ................................. 3-336943

[51] Int. Cl.⁷ .................................................. B41J 2/165
[52] U.S. Cl. ................................ 347/23; 347/30; 347/35
[58] Field of Search .............................. 347/23, 29, 30, 347/35, 17, 19, 90

[56] References Cited

U.S. PATENT DOCUMENTS

| | | | |
|---|---|---|---|
| 4,176,363 | 11/1979 | Kasahara | 347/23 |
| 4,313,124 | 1/1982 | Hara | 347/57 |
| 4,345,262 | 8/1982 | Shirato et al. | 347/10 |
| 4,396,923 | 8/1983 | Noda | 347/191 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,577,203 | 3/1986 | Kawamura | 347/30 |
| 4,608,577 | 8/1986 | Hori | 347/66 |
| 4,723,129 | 2/1988 | Endo et al. | 347/56 |
| 4,740,796 | 4/1988 | Endo et al. | 347/56 |
| 4,970,533 | 11/1990 | Saito et al. | 347/86 |
| 5,068,806 | 11/1991 | Gatten | 395/113 |
| 5,162,817 | 11/1992 | Tajika et al. | 347/7 |
| 5,172,140 | 12/1992 | Hirabayashi et al. | 347/36 |
| 5,297,018 | 3/1994 | Kashimura | 347/23 |
| 5,781,204 | 7/1998 | Kanematsu et al. | 347/23 |
| 5,805,180 | 9/1998 | Ebisawa et al. | 347/23 |

FOREIGN PATENT DOCUMENTS

| | | |
|---|---|---|
| 0499432 | 8/1982 | European Pat. Off. . |
| 0442438 | 8/1991 | European Pat. Off. . |
| 442707 | 8/1991 | European Pat. Off. . |
| 0480473 | 4/1992 | European Pat. Off. . |
| 0496533 | 7/1992 | European Pat. Off. . |

(List continued on next page.)

OTHER PUBLICATIONS

"Storage of Operating Parameters in Memory Integral with Printhead", Robert A. Lonis, *Xerox Disclosure Journal*, vol. 8, No. 6, Nov./Dec. 1983, p. 503.

*Primary Examiner*—Safet Metjahic
*Assistant Examiner*—Thien Tran
*Attorney, Agent, or Firm*—Fitzpatrick, Cella, Harper & Scinto

[57] ABSTRACT

An ink-jet recording apparatus, having a printer that performs recording by Jetting ink from a recording head according to recording data, comprises a plurality of signal lines that supply the recording data to the printer and are connected to a host for controlling the printer, and an information transfer unit for transferring the information to the host. Herein, the plurality of signal lines include at least a first signal line for transferring recording data and commands from the host to the printer, and a second signal line for transferring printer information to the host. Thus, the ink-jet recording apparatus offers excellent cost-efficiency, system reliability and operability.

40 Claims, 18 Drawing Sheets

FOREIGN PATENT DOCUMENTS

| | | |
|---|---|---|
| 54-056847 | 5/1979 | Japan . |
| 55-132259 | 10/1980 | Japan ................................ B41J 3/04 |
| 59-123670 | 7/1984 | Japan . |
| 59-138461 | 8/1984 | Japan . |
| 60-071260 | 4/1985 | Japan . |
| 61-146556 | 7/1986 | Japan ................................ B41J 3/04 |
| 61-177269 | 8/1986 | Japan . |
| 019461 | 1/1987 | Japan . |
| 63-257648 | 10/1988 | Japan . |
| 1120352 | 5/1989 | Japan . |
| 139269 | 5/1989 | Japan . |
| 1182083 | 7/1989 | Japan . |
| 2162046 | 6/1990 | Japan . |
| 2162047 | 6/1990 | Japan . |
| 2165955 | 6/1990 | Japan . |
| 2165960 | 6/1990 | Japan . |
| 2178052 | 7/1990 | Japan . |
| 2198860 | 8/1990 | Japan . |
| 2216696 | 10/1989 | United Kingdom . |

METHOD OF CONTROLLING AN INK-JET RECORDING APPARATUS ACCORDING TO RECORDING APPARATUS IN WHICH THE METHOD IS IMPLEMENTED

This application is a continuation of application Ser. No. 07/992,294, filed Dec. 16, 1992, abandoned.

BACKGROUND OF THE INVENTION

1. Field of the Invention

The present invention relates to an ink-jet recording apparatus having a head/ink tank separable/detachable type ink-jet cartridge in which a detachable ink-jet recording head and a detachable ink tank for reserving Ink to be supplied to the ink-jet recording head are united, and is to a method of recovering the ink-jet recording apparatus.

2. Related Background Art

A conventional ink-jet recording apparatus usually comprises a semi-permanently usable head (hereafter, permanent head), and a detachable ink cartridge for supplying ink to the permanent head via an ink supply means such as a tube. However, when a permanent head is employed, it is hard to eliminate an accidental failure caused by nozzles clogged with dust or a time-sequential failure caused by a deteriorated jet element. To solve this problem of poor reliability the recording apparatus itself possesses, a special maintenance service system must have been organized to keep offering optimal recording performance. From the viewpoint of improved system reliability, the recording head, which is liable to failures, must be able to be replaced periodically at given intervals. From the viewpoint of easy replacement, the recording head must be able to be replaced reliably in units of a given amount of ink. In an effort to meet these requirements, an ink-jet recording apparatus using a detachable head cartridge (hereafter, detachable head) in which an ink tank and an ink head are united has been put to practical use.

However, when a detachable head is employed, a usable amount of ink cannot be set to be large. This is intended to ensure reliability and is attributable to the size and weight of the detachable head itself. As a result, a running cost becomes higher than that when a permanent head is employed. When the ink is used up, even if a head drive function works satisfactorily, the head must be discarded. This may evoke a latent problem of environmental contamination which is a worldwide concern these days. To cope with this problem, an ink-jetrecording apparatus in which a head and an ink tank are replaceable independently of each other has been proposed. This ink-jetrecording apparatus offers excellent reliability by exploiting the feature of a detachable head, hardly increases the operating cost, and assists in conserving global environments.

Typically, in a conventional transferred information processing method, generally, programs-for transmitting commands from a host to a printer are written so that the commands will be sent according to the command control system of the printer, and the commands are transferred sequentially via a printer driver.

In a recording apparatus using an ink tank/head detachable type ink-jetrecording head which is constructed as described above, a large number of parts are required to indicate numerous items that must be indicated appropriately, such as ink tank replacement time and a head replacement time, and items for selecting an optimal suction recovery sequence depending on whether the ink tank alone or the head alone is replaced. This is not cost-efficient at all. Moreover, since numerous items are padded to a narrow display area, each item becomes indiscernible.

On the other hand, in information processing, given commands for a printer are entered using dedicated keys on the printer. A command cannot be transferred as an interrupt to the printer using a keyboard of a host. When this kind of system is used, a large number of dedicated keys must be formed on a printer to implement diverse printing control functions or printing modes. This cannot help but increase the size of a printer that is supposed to be compact. Such an increase in size not preferred. Furthermore, a command or mode that must be executed or activated at once cannot be specified as an interrupt due to greatly diversified modes. Thus, the operability is unsatisfactory.

One of problems of the ink-jet recording apparatus having the aforesaid construction, as pointed out by the present inventor, is that a recovery procedure different from a normal head recovery procedure must be executed when a recording head or an ink tank is replaced. For example, when an ink tank is replaced, bubbles may enter an ink supply path located between the ink tank and a recording head. The bubbles must be removed prior to recording. Furthermore, recording characteristics specified in the process of manufacturing a recording head may deteriorate as time passes. Therefore, when a recording head is replaced, special preliminary jet or other run-in (aging) must be carried out to recover the recording characteristics, or thickened ink that has stuck to jet nozzles during physical distribution must be removed. A different recovery procedure may be required depending on a state that a recording head is mounted on and secured to a carriage which scans together with the recording head, or on a state that a recording head and an ink tank are joined with an ink supply path.

On the other hand, a recording head must be controlled electrically. Therefore, when the recording head is mounted and secured, how to the recording head is electrically coupled with a carriage becomes significant. Furthermore, how an ink supply path is connected is critical even when solid ink is employed. When liquid ink is employed, in particular measures must be taken to prevent leakage of ink from the location at which the ink supply path is connected. This is because leaked ink messes up the interior of a system, spoils recording paper, or stains hands. When it comes to the connection of the ink supply path, In particular, it is very hard in practice to materialize a simple construction that satisfies the demands for reliable connection and which is reliable enough to prevent ink leakage and which provides for separation which is easy enough to allow effortless replacement of an ink tank.

SUMMARY OF THE INVENTION

The present invention attempts to solve the aforesaid problems. An object of the invention is to provide an ink-jet recording apparatus in which a display means and a keyboard in a host are fully utilized so that not only data but also commands can be transferred between the host and a printer over common signal lines, and improved operability is offered.

The present invention attempts to achieve the foregoing object, and provides an Ink tank/head separable/detachable type ink-jet recording apparatus that adopts a method In which data and commands are transferred between a host and a printer over common signal lines, and that includes an information transfer means based on the method for transferring information of the printer to the host, and a transferred information processing means that handles the transferred information using the facilities of the host (for example, CRT and a buzzer).

The present invention provides an ink tank/head separable/detachable type ink-jetrecording apparatus including a storage element capable of being referenced commonly by the control units of a host and a printer, and an information processing means that operates according to information existent in the storage element in the host.

In the foregoing construction, a means that, if necessary, transfers items required for clarifying the state of a head to a host over an interface cable, and informs a user of the items using a control unit and a display (CRT) in a main body is incorporated. The incorporation of the means solves problems relevant to display of items.

Furthermore, common signal lines are used to transfer data or commands between a host to a printer. Therefore, various printer control functions including functions for selecting a printing control function and printing mode using a keyboard on the host are set in the keys of the keyboard. When a key is pressed, a command allocated to the key is transferred as an interrupt, then executed promptly.

As for an invention regarding a procedure of recovering an ink-jetrecording apparatus, an ink-jet recording apparatus according to the present invention comprises a head/ink tank separable/detachable type ink-jet cartridge in which a detachable ink-jet recording head and a detachable ink tank for reserving ink to be supplied to the ink-jet recording head are united, and a control means that varies a recovery sequence involving ink jets to be shot from the ink-jet cartridge depending on whether or not the ink-jet recording head has been replaced.

In a method of recovering an ink-jet recording apparatus according to the present invention, a recovery sequence involving ink jets to be shot from a head/ink tank separable/detachable type ink-jet cartridge, in which a detachable ink-jet recording head and a detachable ink tank for reserving ink to be supplied to the ink-jet recording head are united, is varied depending on whether or not the ink-jet recording head has been replaced.

The present invention is most advantageous when implemented, especially, in an ink tank/head separable/detachable type ink-jet recording apparatus in which an ink tank is pressed to attach and fix the ink tank and head to a carriage. In this ink-jet recording apparatus, the direction of pressing the ink tank, the direction of connecting the ink tank with the head, and the direction of connecting the head with the carriage are substantially the same. This construction permits reliable connections, and offers improved operability in replacing an ink tank or head.

In addition, when the direction of connecting the head and carriage with an electrical coupling means is substantially identical to that of pressing the ink tank, electrical coupling can be accomplished reliably with a simple construction.

Furthermore, when a connecting means is attached to each of the ink tank and head so that the ink tank and head can be connected with or separated from each other outside the carriage, improved operability can be provided.

In the present invention, a recovery sequence involving ink jets from a head/ink tank separable/detachable type ink-jet cartridge in which a detachable ink-jet recording head and a detachable ink tank for reserving ink to be supplied to the ink-jet recording head are united is varied depending on whether or not the ink-jet recording head has been replaced. Consequently, an optimal recovery sequence can be executed without regard to whether or not the ink-jet recording head has been replaced.

DESCRIPTION OF THE PREFERRED EMBODIMENTS (Embodiment 1)

Figure 1:
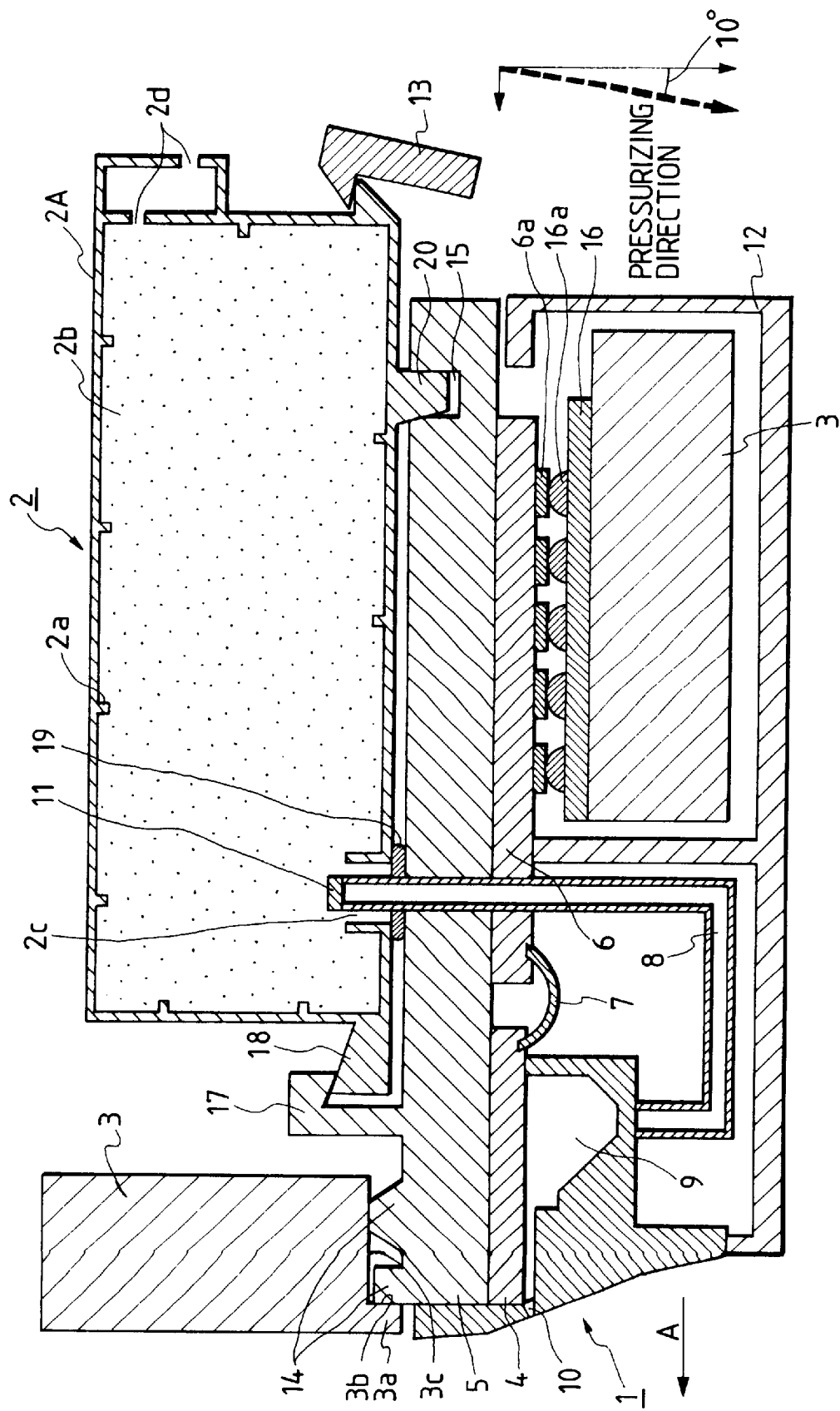
FIG. 1 is a cross-sectional diagram showing a state in which a detachable recording head and a detachable ink tank of the first embodiment of the present invention are mounted on a main body.

FIG. 1 is a cross-sectional diagram showing a state in which a recording head, an ink tank, and a carriage for an ink-jet recording apparatus of the present invention are united. The recording head in this embodiment is of the ink-jet type in which recording is done using electrothermal transducers that generate thermal energy for causing film boiling of ink according to electric signals. In FIG. 1, main components of a recording head 1 are attached or press-fitted to a head base plate 5 in consecutive order, wherein an alignment projection and notch formed on the head base plate 5 are used as position references. On a heater board 4, multiple electrothermal transducers (jet heaters) set in array on a silicon substrate, and aluminum electric wires for supplying power to the electrothermal transducers are integrated using a film integration technology. The heater board 4 is connected to a head printed circuit board 6 by performing wire bonding, so that the electric wires on the heater board 4 will be associated with the wires on the head printed circuit board 6 that have pads for receiving electric signals from a main unit at their ends. A ditched top plate 10 is a polysulfone-molded unit, wherein partitions for separating multiple ink passages in association with the jet heaters and a common chamber 9 for routing ink from an ink tank 2 through the supply path 8 to the ink passages are molded to form orifices serving as multiple jet nozzles. The ditched top plate 10 is pressed onto the heater board 4 using a spring that is not shown, press-fitted and fixed to the heater board 4, and sealed using a sealing agent. Thus, an ink jet section is formed. The supply path 8 joined and sealed with the ditched top plate 10 in this embodiment is running through holes bored on the head printed circuit board 6 and head base plate 5 to appear on the opposite side of the head base plate 5. The supply path 8 is attached and fixed to the head base plate 5 at the exit of the through hole of the head base plate 5. The end of the supply path 8 that is connected to the ink tank 2 is covered with a filter 11 for preventing inflow of dust and unexpected bubbles into the jet section. A head cover 12 is attached to protect the jet section of the recording head 1 and the pads for electrical coupling and to facilitate easiness in handling the recording head 1.

The detachable ink tank 2 comprises a tank case 2A having ribs 2a on its inner surface, an ink absorbent 2b that is moistened with ink and padded tightly in the tank case 2A, an ink supply hole 2c through which the end of the supply path covered with a filter is inserted to route ink to the recording head 1, and air communication holes 2d through which air is taken into the ink tank to enable an outflow of ink and which thus prevents occurrence of excess negative pressure. The ribs 2a are formed on the inner wall of the tank so that air will not directly communicate with the supply hole along the inner wall of the tank case but ink existent all over the ink absorbent will be fully utilized by means of capillary force. The air communication holes 2d are bored far away from the ink supply hole 2c. The ribs 2a help reinforce the tank case 2A and improve operability in replacing a tank. An initial quantity of moistened ink is smaller than a quantity of ink absorbable in the ink absorbent 2b. This is intended to achieve such a functional object that stable jets must be shot by applying negative head pressure to the menisci of the jet nozzles when the ink tank is connected to the recording head 1, and such an operability-oriented object that no ink must leak out despite a minor impact occurring during replacement of an ink tank. At the air communication holes 2d, ink of the ink absorbent may be vaporized or another vaporizable absorbent may be installed to restrict ink leakage from the air communication holes 2d.

When a quantity of ink moistened in the ink absorbent 2b becomes very small, if a large quantity of air is taken out of the ink absorbent via the filter 11, the ink tank 2 cannot supply ink any more. A large quantity of air is taken out of the ink absorbent via the filter 11, when the ink suction force of the ink absorbent 2b overpowers the capillary forces of the nozzles occurring with ink Jets that determine the capability of supplying ink to the recording head 1 or when a large amount of air taken in through the air communication holes 2d stays around the filter 11.

Figure 4:
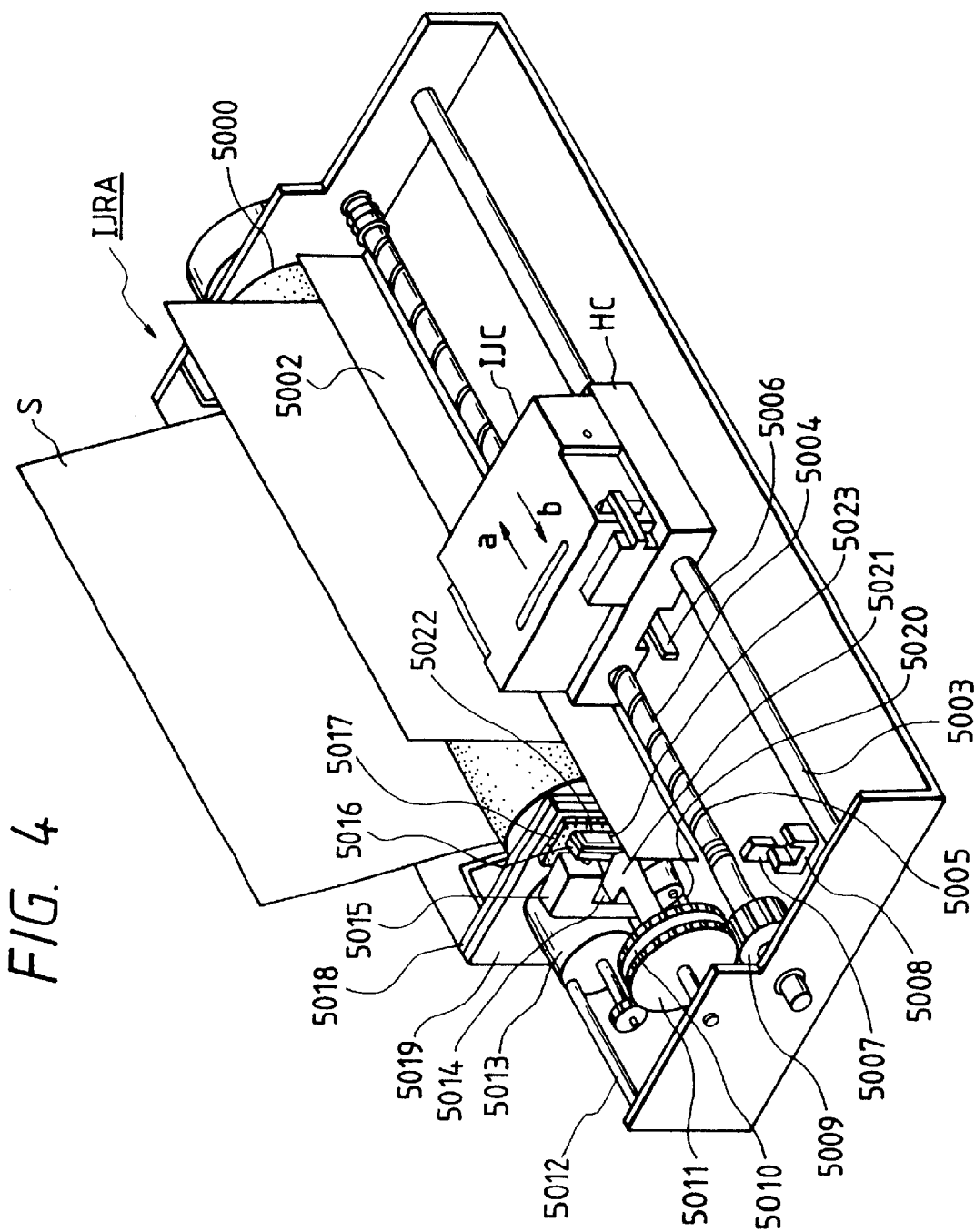
FIG. 4 shows an example of an ink-jet recording apparatus to which the present invention can apply.

The operation of a recording apparatus will be described briefly in conjunction with FIG. 4, thus explaining the position of a recording head in the recording apparatus, and the operation of the recording head. In FIG. 4, a recording medium S is guided using a platen roller 5000 so that the bottom of the recording medium S will come upward. Using a paper presser plate 5002, the recording medium S is pressed against the roller 5000 in the moving direction of a carriage.

A carriage HC is held and engaged with a lead screw 5005 that rotates with its carriage drive pin fitted to a spiral ditch 5004, and thus serves as a drive source, and with a slider 5003 running in parallel with the lead screw. The carriage HC laterally reciprocates across the recording surface of the recording medium S guided above the platen roller 5000. Interlocked with rotation or reverse of a drive motor, the lead screw 5005 is driven to rotate by drive transmission gears 5011 and 5009. 5007 and 5008 denote home position detecting means, which use a photocoupler to check presence of a lever 5006 in this area and switch the rotating direction of a motor 5013. An image recording signal is sent to a recording head at the time when the carriage moves with the recording head mounted. With the image recording signal, ink drops are jetted at a given position to perform recording. 5016 denotes a member for holding a capping member 5022 that caps the front of the recording head. 5015 denotes a suction means that sucks the cap. The suction means 5015 performs suction recovery on the recording head by sucking the recording head through an opening 5023 of the cap.

5017 denotes a cleaning blade. 5019 denotes a member allowing the blade to move back and forth. The cleaning blade 5017 and member 5019 are held by a main body support plate 5018. It is not necessary that the suction means and blade have the shapes shown in FIG. 4. Any known shapes can apply. 5012 denotes a lever for determining the timing of suction recovery. The lever 5012 moves with movement of a cam 5020 engaging with the carriage. The movement of the lever 5012 is controlled by a known transmission means such as a clutch that transmits a driving force provided by the drive motor. These recovery means are constructed so that when the carriage comes in a home position area, the recovery means will perform desired operations at their specific positions according to given timing by means of the operation of the lead screw 5005. The recording head is coupled with the carriage HC mechanically and electrically as described below. A carriage HC comprises, as shown in FIG. 1, a front plate facing a platen (the front of a head), a flexible sheet provided with head drive electrodes 16a associated with pads 6a on a printed circuit board of a recording head, an electrical coupling support plate 16 for holding a rubber pad that generates elastic force for pressing the flexible sheet from the back, head aligners 14 for mechanically securing a recording head 1, and a pressurizing hook 13 for pressurizing an ink tank 2 and a recording head 1 in the arrow A direction. The front plate has two alignment reference surfaces in association with the aforesaid alignment projection and notch formed on a head base plate 5 of the recording head 1. The pressurizing hook 13 of the carriage 3 is constructed to generate pressure in the pressurizing direction shown in FIG. 1; that is, in the direction about 10° inclined with respect to the moving direction of the carriage 3. With the pressure, the recording head 1 is pressed toward the front plate and toward the electrical coupling support plate 16. At the same time, the head aligners 14 are pressed in the moving direction of the carriage 3 with the electrical coupling support plate 16 as a supporting point. The pressurization and engagement by the pressurizing hook 13 may be accomplished in any manner, but should preferably be controlled using a lever that can be manipulated from the top of the carriage 3. In any case, when the pressurizing hook 13 is engaged, the recording head 1 and detachable ink tank 2 slightly rotate on the carriage HC and are electrically coupled when the alignment projection and notch are brought into contact with the reference surfaces of the front plate. Therefore, the pads 6a on the head printed circuit board and the head drive electrodes 16a are reliably aligned with one another.

Figure 2:
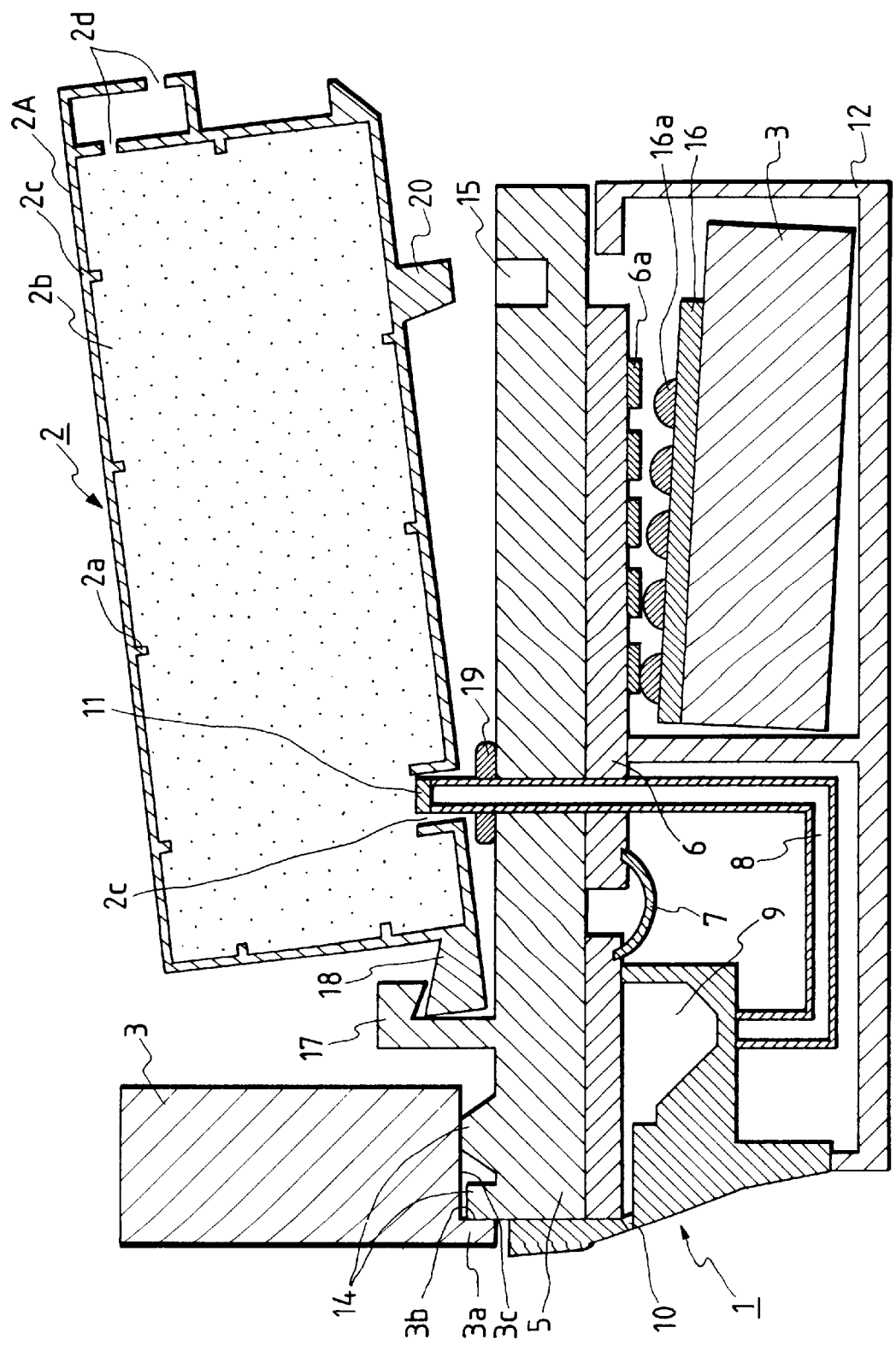
FIG. 2 is a top view showing a state of connecting the first embodiment.
Figure 3:
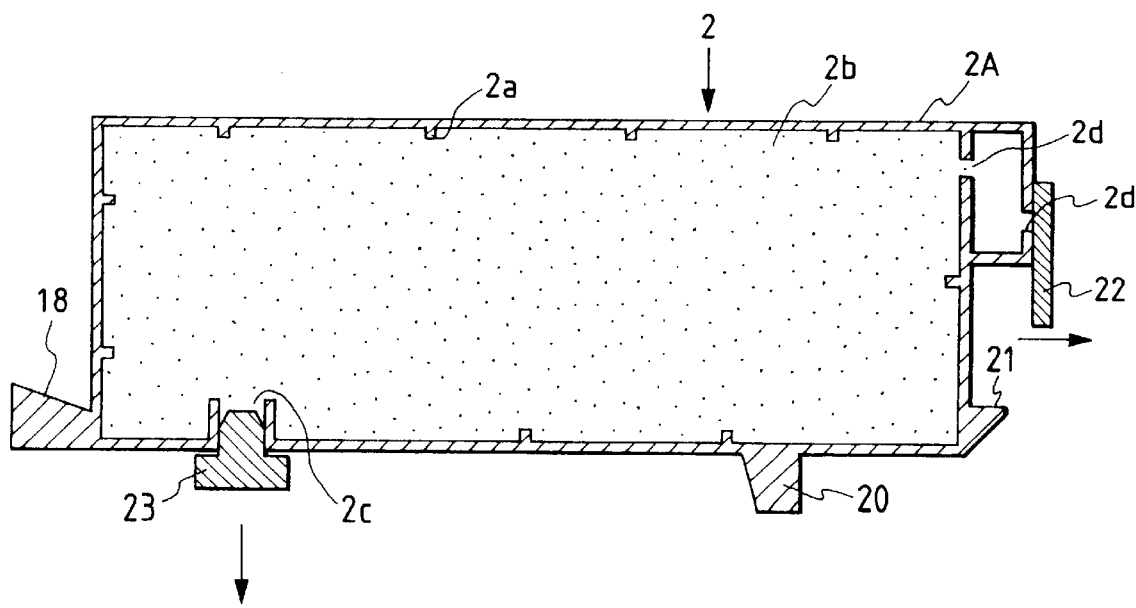
FIG. 3 is a cross-sectional diagram for explaining a tank replacement procedure for the first embodiment.

The connection between the recording head 1 and ink tank 2 is, as shown in FIG. 2, achieved with pressure of a tank band spring. That is to say, a tank band whose one end is fixed to the head base plate 5 of the recording head 1 is aligned with the outer wall of the detachable ink tank 2 near the ink supply section, then a ring-type tank band hook attached to the back of the tank band spring located at the other end of the tank band is pressed to hook a band projection formed on the head base plate 5. Thereby, the recording head 1 and ink tank 2 are united. The connection of the detachable ink tank 2 can be achieved outside the carriage as shown in FIG. 3. Specifically, first, a tank guide 20 of the detachable ink tank 2 is fitted into a tank guide hole 15 on the head base plate 5. The position at which the tank guide 20 is fitted into the tank guide hole 15 is set in the vicinity of the site of action of the pressurizing hook 13 of the carriage 3, and the ink supply hole 2c is located as far as possible from the site of action of the pressurizing hook 13. This makes it possible to minimize the component force of pressurizing force that occurs at the ink supply hole 2c when the carriage 3 is mounted. Consequently, the ink supply path can be connected reliably. The connection between the recording head 1 and detachable ink tank 2 will now be discussed. As is apparent from FIG. 2, the detachable ink tank 2 rotates clockwise in FIG. 2 with a pressurizing force applied by the pressurizing hook 13 serving as a site of force. At this time, the ink supply hole 2c serves as a site of action with the position, at which the tank guide 20 is fitted into the tank guide hole 15, as a supporting point. Consequently, force discouraging connection occurs at the ink supply section. At the ink supply hole 2c, an ink absorbent 2b is pressed and joined to a filter 11 with the connection force deriving from the tank band. Thus, the ink supply path is connected. An elastic ring seal 19 placed between the head base plate 5 and the outer wall of the detachable ink tank is pressurized to deform. As a result, the head base plate 5 and the outer wall of the detachable ink tank are brought into close contact with each other. Thereby, inflow of air to the ink tank through the ink supply hole 2c is perfectly shutting out. If the shutout is imperfect, every time ink is supplied to the recording head 1, air is taken into the ink tank directly through the ink supply hole without flowing through the Ink absorbent 2b. This disables effective use of ink moistened in the ink absorbent 2b.

However, in the present invention, the connection force deriving from the tank band spring in the ink supply section is larger than the action force of the pressurizing hook 13. Therefore, when the ink tank and recording head are mounted on the carriage 3, ink supply can be achieved reliably.

The pressurizing hook 13 shown in FIG. 1 is used to align the recording head 1 with the carriage 3 relative to the longitudinal direction of paper. Therefore, the pressurizing direction is set to a direction inclined by 10°. When the pressurizing hook 13 is designed to hook the head base plate 5, the shape of the head base plate 5 becomes complex. Therefore, when the pressurizing hook 13 is designed in the same manner as the present invention to hook the detachable ink tank 2, a simpler construction is realized with high mechanical precision. This is because the ink tank 2 is remodeled more easily. When the recording head 1 and detachable ink tank 2 are connected with each other, force occurs in the direction perpendicular to the connecting direction. In the present embodiment, as shown in FIG. 1, the force is absorbed by fitting the tank guide 20 into the tank guide hole 15. That is to say, when the tank guide 20 is brought into contact with the inner wall of the tank guide hole 15 on the side of paper, the recording head 1 is aligned and joined with the carriage 3 by the head aligners 14 and with the perpendicular force. In this embodiment, the backlash of the supply path 8 at the ink supply hole 2c of the detachable ink tank 2 is set larger than the backlash of the tank guide 20 in the tank guide hole 15. This is intended to prevent redundant mechanical force from working on the supply path 8 that is directly connected to the jet section which must be positioned with high precision. Thus, the force occurring in the direction perpendicular to the connecting direction of the ink tank 2 is absorbed by the section for connecting the tank guide 20. The section for connecting the tank guide 20, in this embodiment, also plays a role of preventing rotation of the detachable ink tank 2 on the plane of the head base plate 5. A backlash on the plane is determined for fear that any extra force will be applied to the supply path 8.

The ring seal 19 in this embodiment is shaped as a bit larger elastic ring so that the junction with the outer wall of the detachable ink tank will be large enough to permit a backlash of the ink supply hole 2c.

Figure 11:
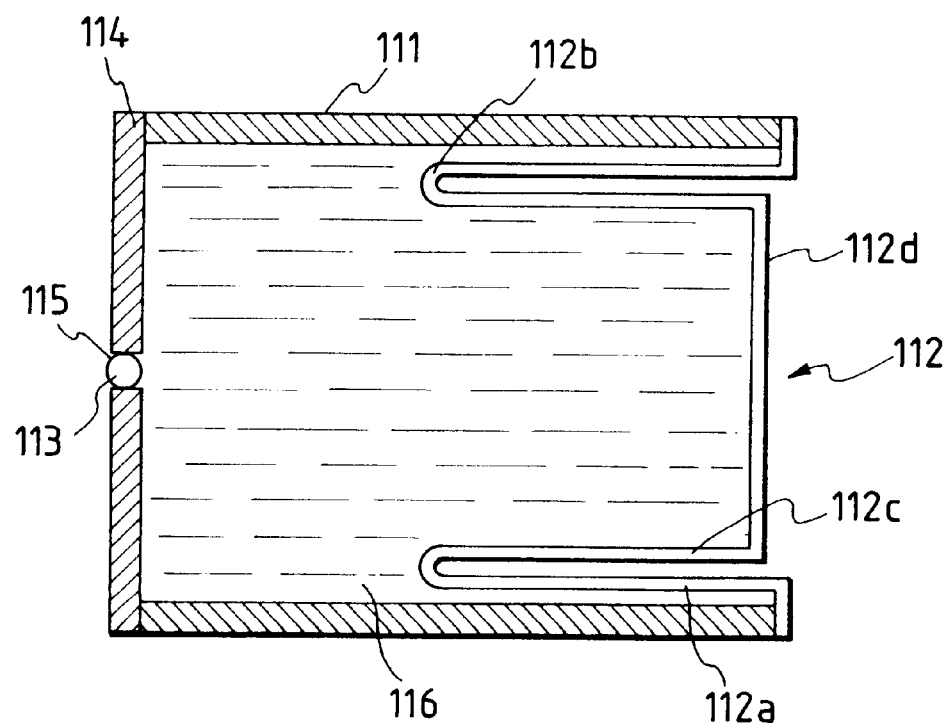
FIG. 11 is a cross-sectional diagram showing an example of an ink tank without an ink absorbent.
Figure 12:
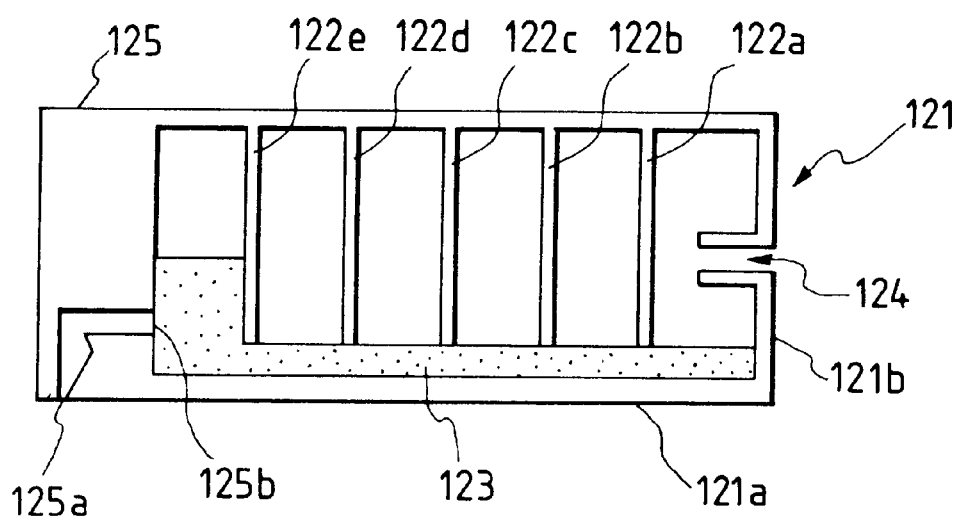
FIG. 12 is a cross-sectional diagram showing an example of an ink tank without an ink absorbent.

In this embodiment, the ink tank may have such a construction, as shown in FIG. 11 or 12, that the ink absorbent is removed and ink is accommodated in the entire tank.

An ink container shown in FIG. 11 is formed with a cylindrical housing 111 one of whose end surfaces is sealed with a bottom plate 114 and the other surface of whose end surfaces has an opening which is closed with a flexible member made of a soft plastic or other flexible material. An outlet 115 for discharging ink is formed on the bottom plate 114. The outlet 115 is closed with a ball cock 113 serving as a closing means when the ink container is not in use. The ink container accommodates ink 116.

The margins of the flexible member 112 are fixed to the ends of the opening of the housing 111. The flexible member 112 consists of outer wall portions 112a that are bent portions near the margins of the flexible member 112, and that are extending along the inner wall of the housing 11 in the longitudinal direction of the housing 111, bending portions 112b that are bending in the opposite direction of the outer wall portions 112a at nearly the center of the housing 111, inner wall portions 112c (2c in FIG. 3) that extend from the bending portions 112b along the outer wall portions 112a to the vicinity of the opening of the housing 111, and a disk-like bottom portion 112d that is an extension of the inner wall portions 112c. FIG. 11 is a schematic diagram. The shape of each of the bending portions 112b is not limited to the one shown in FIG. 11, but may swell up or bend with a relatively large curvature depending on the property of the 121, except for the porous body 123, material.

In an ink container 121 shown in FIG. 12, a porous body 123 represented by a sponge is placed on a bottom 121a. The ink container is divided with five partitions 122a to 122e into six chambers. The container may be made of a material which allows a user to recognize the content of the container. This permits visual inspection of an amount of remaining ink. On a back wall 121b of the container 121, a tubulous air communication hole 124 is bored to project in the central region of a chamber. When ink is reserved in the thus-constructed chamber in which the air communication hole 124 is projecting, the ink will not leak out regardless of the posture of the ink container as far as the amount of ink is less than half of the volume of the chamber.

Next, an information processing method will be described specifically with reference to the drawings.

Figure 5:
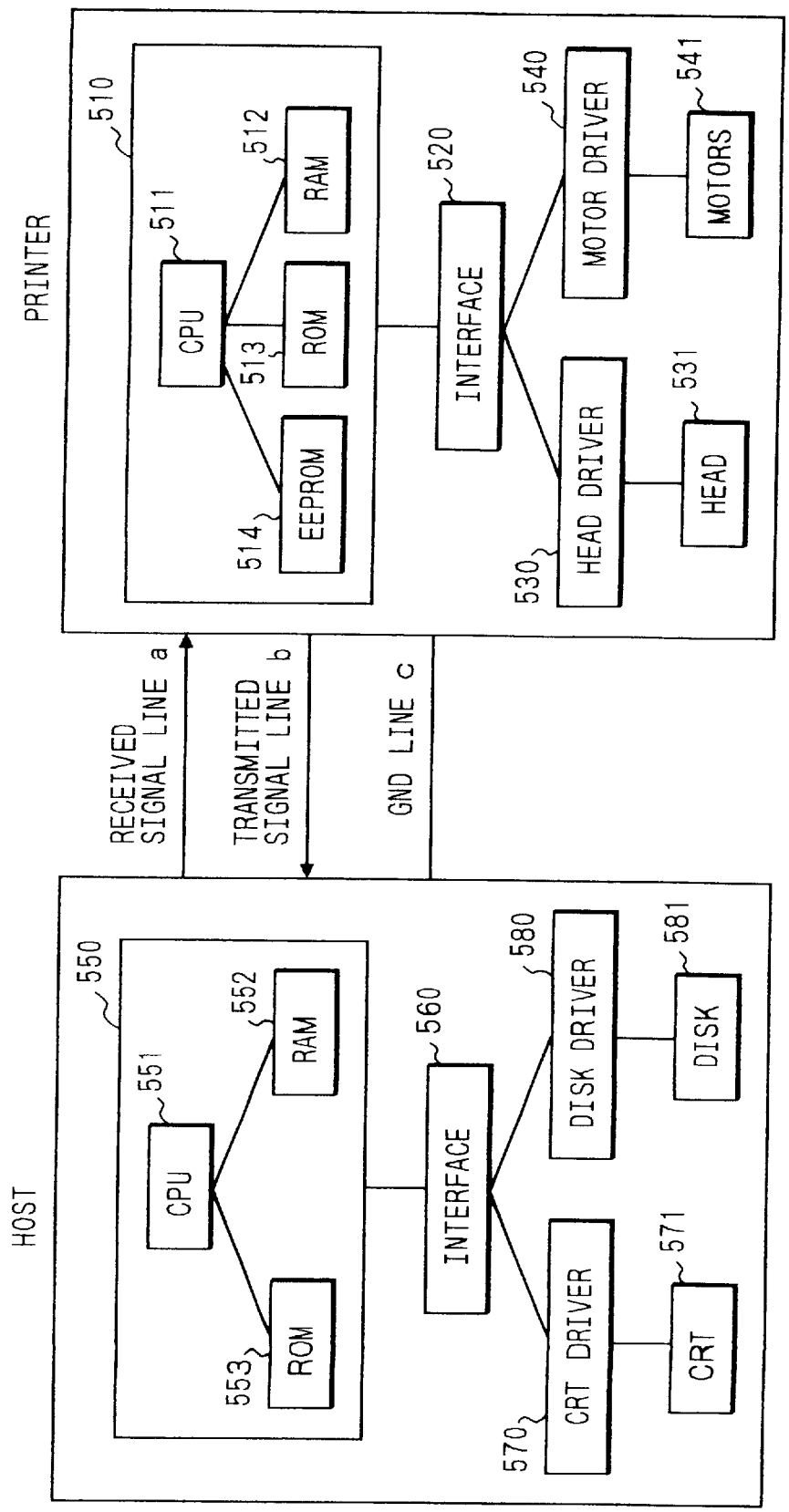
FIG. 5 is a block diagram of the control systems of a hose and a printer.

FIG. 5 is a block diagram showing control systems for driving the members of a printer and a host, and a transmitting/receiving system for the printer and host. As shown in FIG. 5, the control system of the printer comprises a control unit 510 including a CPU 511 realized, for example, with a microprocessor, a ROM 513 containing the control programs of the CPU 511 and various data, a RAM 510 serving as a work area of the CPU 511 and storing various data temporarily, and an EEPROM 514 for storing various head information even after the power supply is turned off for replacement of a head, an interface 520, a motor driver 540 for driving motors, and a driver 530 for driving a recording head. On the other hand, the control system of the host comprises a control unit 550 including a CPU 551 realized, for example, with a microprocessor, a ROM 553 containing the control programs of the CPU 551 and various data, a RAM 552 serving as a work area of the CPU 551 and storing various data temporarily, an interface 560, a disk driver 580 for driving a recording medium, and a driver 570 for driving a CRT. The signaling system for connecting between the printer and the host comprises three signal lines; a receiving signal line a for receiving commands from the host, a transmitting signal line b for transmitting information from the printer, and a ground line c.

The signal sent from the host over the receiving signal line a is divided into two types of signals; Immediate and Device commands. The Immediate command is a command that is executed as soon as it is received, including a reset signal and a return code returned to the host to indicate an error state (however, a return code signal issued to the host is transmitted over the transmitting signal line b). On the other hand, the Device command includes an image signal command that transfers image data. In this embodiment, three high-order bytes of a sent command are analyzed. If the three high-order bytes indicate &HFF, the command is recognized as an Immediate command. Then, interrupt processing is carried out to execute the command immediately.

Figure 7:
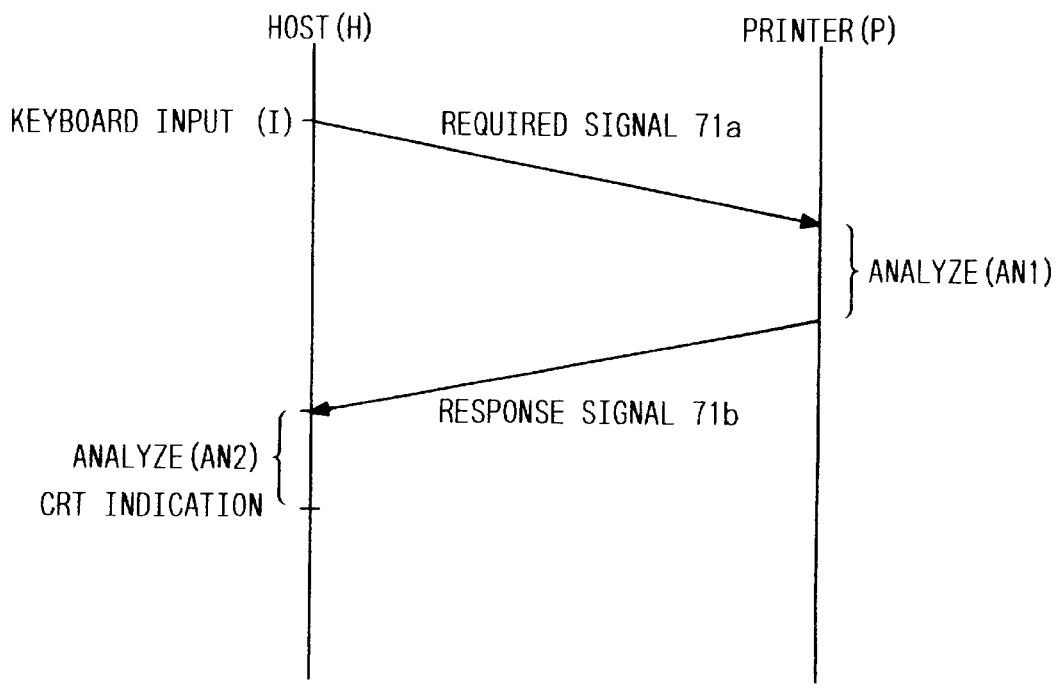
FIG. 7 is an explanatory diagram for data transfer using an Immediate command.

Next, data transfer using an Immediate command will be described in conjunction with FIG. 7. When requesting a state of a head or a major component of the present embodiment, or any other information that must be displayed, a host H sends a request signal 71a as an Immediate command to a printer P over a receiving signal line a shown in FIG. 5. Then, the printer P analyzes the request signal 71a, then transmits a response signal 71b as requested information to the transmitting host H over a transmitting signal line b shown in FIG. 5. Under the control of the host H, if necessary the information is displayed on a CRT or reported to a user with a buzzer.

Items whose transfer is requested by the host, and Immediate commands for this embodiment are listed below.

| Request item | Immediate command |
|---|---|
| 1. Tank replacement time (amount of remaining ink) | [FF, FF, FF, 01] |
| 2. Chip replacement time | [FF, FF, FF, 02] |
| 3. Amount of ink discharged by suction | [FF,FF,FF,03] |
| 4. Font currently selected | [FF,FF,FF,04] |
| 5. Recording speed mode currently selected | [FF,FF,FF,05] |
| 6. Display of "Suction is under way." | [FF,FF,FF,06] |
| 7. Display of "Aging" | [FF,FF,FF,07] |
| 8. Display of "Suction" | [FF,FF,FF,08] |

The meanings of the request items will be outlined below.

Item 1 means that data representing an amount of remaining ink existent in an EEPROM 514 should be referenced and transferred to a host (herein, the EEPROM 514 contains data representing the number of dots recorded after replacement of a tank and an amount of ink discharged by suction. The data are updated all the time).

Item 2 means data representing how long a remaining service life of a chip is should be transferred. The activity ratio of a new chip after replacement is stored in the EEPROM 514.

Item 3 means that a total amount of ink discharged by performing suction recovery should be transferred. In this embodiment, an absorbent in which discharged ink is stored temporarily is detachable. Therefore, the data representing an amount of ink discharged indicates a time of replacing a tank with a new one.

Item 4 means that the type of font currently selected in the printer should be transferred. Nowadays, an increasing number of printers are supporting ten or more types of fonts in a standard composition. It is important to indicate a selected font clearly.

Item 5 means that the type of print mode currently selected in the printer should be transferred.

Item 6 means that data representing a state in which suction recovery is under way in the printer should be transferred. When a suction recovery procedure is under way, even if a print command is received, printing is not carried out. Unless a clear indication appears, this state may be mistaken for a failure. It has a significant meaning to clearly indicate a reason why printing is not carried out.

Item 7 means that data representing a state in which aging is in progress should be transferred. A chip member used in this embodiment shoots 50000 preliminary jets (aging) for each nozzle to ensure stable initial jets.

Item 8 means that information representing whether or not a recording head is currently in need of suction recovery should be transferred. For example, if printing is carried out continuously at a high duty cycle, bubbles may remain in the recording head. This results in unstable Jets. A means currently available executes automatic suction when it becomes possible that unstable jets will be shot. However, a suction recovery procedure may be unnecessary for some heads. Using this means, suction is performed forcibly even on a head that does not require suction recovery. This leads to an increase in operating cost. Therefore, whether or not to perform suction is left to a user's discretion. Then, the system merely indicates that a suction recovery procedure should be executed sooner or later. This is very significant.

Next, the timing of requesting any of the aforesaid items will be described specifically.

<Timing 1: with power on>

When the power supply of a main body is turned on, the host requests the printer to transfer data of the aforesaid request items 1 to 8.

<Timing 2: immediately after paper is fed>

When a recording medium is fed, the host requests the printer to transfer data of the aforesaid request items 1, 2, 4, 5, and 8.

<Timing 3: when a chip is replaced>

When a suction recovery procedure is executed, the host requests the printer to transfer data of the aforesaid request items 3 and 6.

<Timing 4: when a chip is replaced>

When a recording head chip is replaced, the host requests the printer to transfer data of the aforesaid request items 7 and 8.

<Timing 5: when a tank is replaced>

When an ink tank is replaced, the host requests the printer to transfer data of the aforesaid request item 8.

In this embodiment, requested information is transferred according to the above timing.

Next, how received data is handled by a host will be described specifically.

In this embodiment, under the control of a host, the contents of received data are displayed on a CRT of the host for a certain period of time (about ten seconds) after reception. Since received data is displayed for a certain period of time, printer information is reported to a user reliably according to the aforesaid timing.

Figure 16:
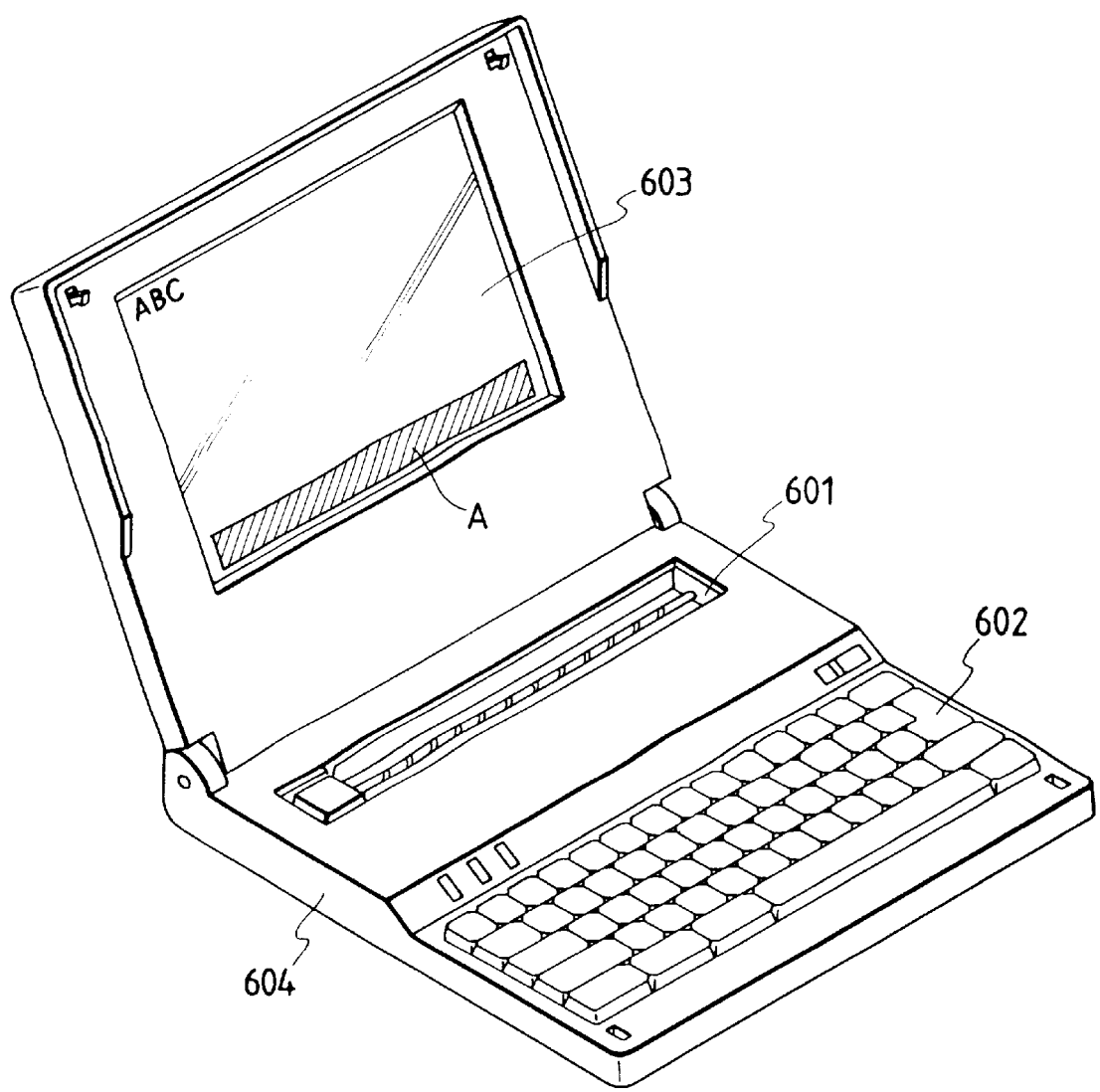
FIG. 16 is an oblique view schematically showing an appearance of an information processor in which a recording apparatus is incorporated.

Preferably, received data should be displayed on a portion of the CRT of the host such that a user will notice it readily but will not find it inconvenient in operating the host. For example, in a personal computer having a built-in printer as shown in FIG. 16, a display space is allocated to a place A on a liquid crystal display (hereafter, LCD) screen. Thus, received data can be displayed without intervening in user's operation. The display space may appear on the LCD only for a certain period of time after received data is accepted, or may be inverted with a background color. Thereby, the display space becomes further noticeable to a user.

In this embodiment, the host instructs the printer to transmit requested data under given rules. Alternatively even when no command is sent from the host, the printer may transmit designated data as interrupt data under given rules.

Received data handled by the host may remain displayed. Alternatively, the data may be stored and may not be displayed automatically unless a user enters a command.

The data (request items) and request timing adopted in this embodiment are merely exemplary, to which the present invention is not restricted.

Figure 8:
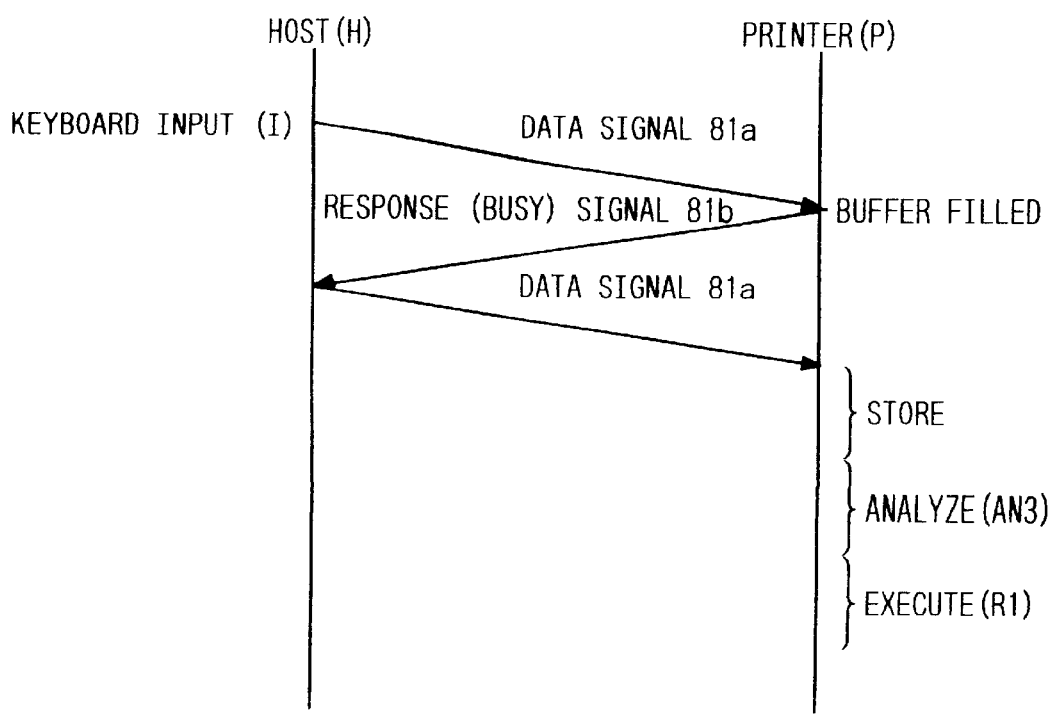
FIG. 8 is an explanatory diagram for data transfer using a Device command.

FIG. 8 shows an example of sending a Device command from a host. When a Device command is entered at a keyboard of a host H, the host H sends a data signal 81*a*. If a buffer in a printer P is full, the printer P returns a response (Busy) signal 81*b* to the host H. In response to the response (Busy) signal 81*b*, the host H re-sends the data signal 81*a* right away. At that time, if data of the buffer has been stored in a ROM, the data signal 81*a* is put in the buffer. After being analyzed, the data signal 81 is executed (printed).

Figure 9:
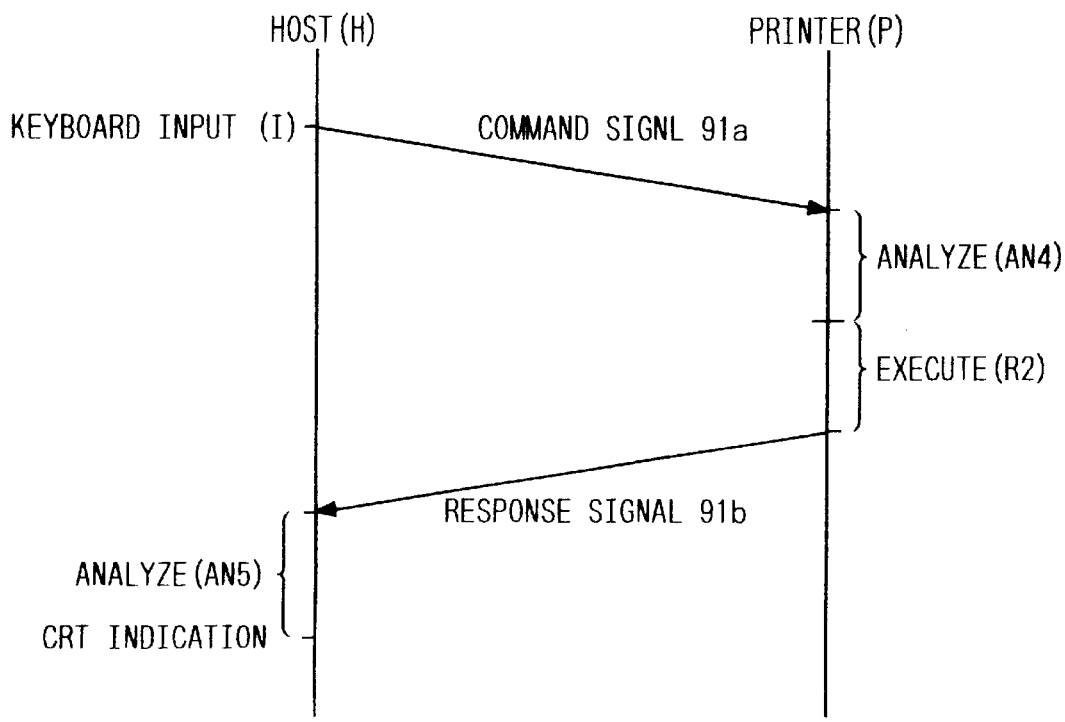
FIG. 9 is an explanatory diagram for data transfer using a control instruction.

In an example of FIG. 9, various printer control functions are set in keys of a keyboard of a host so that a print control function or a print mode can be selected at the keyboard of the host. When any key is pressed, an associated command is sent as an interrupt and executed immediately. When various control information of a printer P are entered at a keyboard, a host H sends a command signal 91*a* to the printer P over a receiving signal line a according to the keyboard entry I. Then, the printer P analyzes the signal, then executes the control command. Then, the printer P places the result as a response signal 91*b* on a transmitting signal line b, and sends it to the transmitting host H. Under the control of the host H, if necessary, the resultant information is displayed on a CRT or reported to a user with a buzzer.

According to the foregoing control procedures, even when an ink tank/head detachable type ink-jet recording head, in which many items must be displayed to indicate a state of the head, is employed, numerous display sections need not be installed in a printer. Therefore, no extra cost arises. Furthermore, a CRT of a host can be utilized, if necessary. Therefore, a substantial number of items are displayed.

(Embodiment 2)

Next, another embodiment of a system in which a printer and a host are integrated will be described.

In this embodiment, a printer and a host are integrated to eliminate a protocol for information transfer between the printer and host. Furthermore, a common memory means the printer and host can reference is installed to substitute for an information communication means employed in the first embodiment.

Control systems for driving members in this embodiment will be described.

Figure 6:
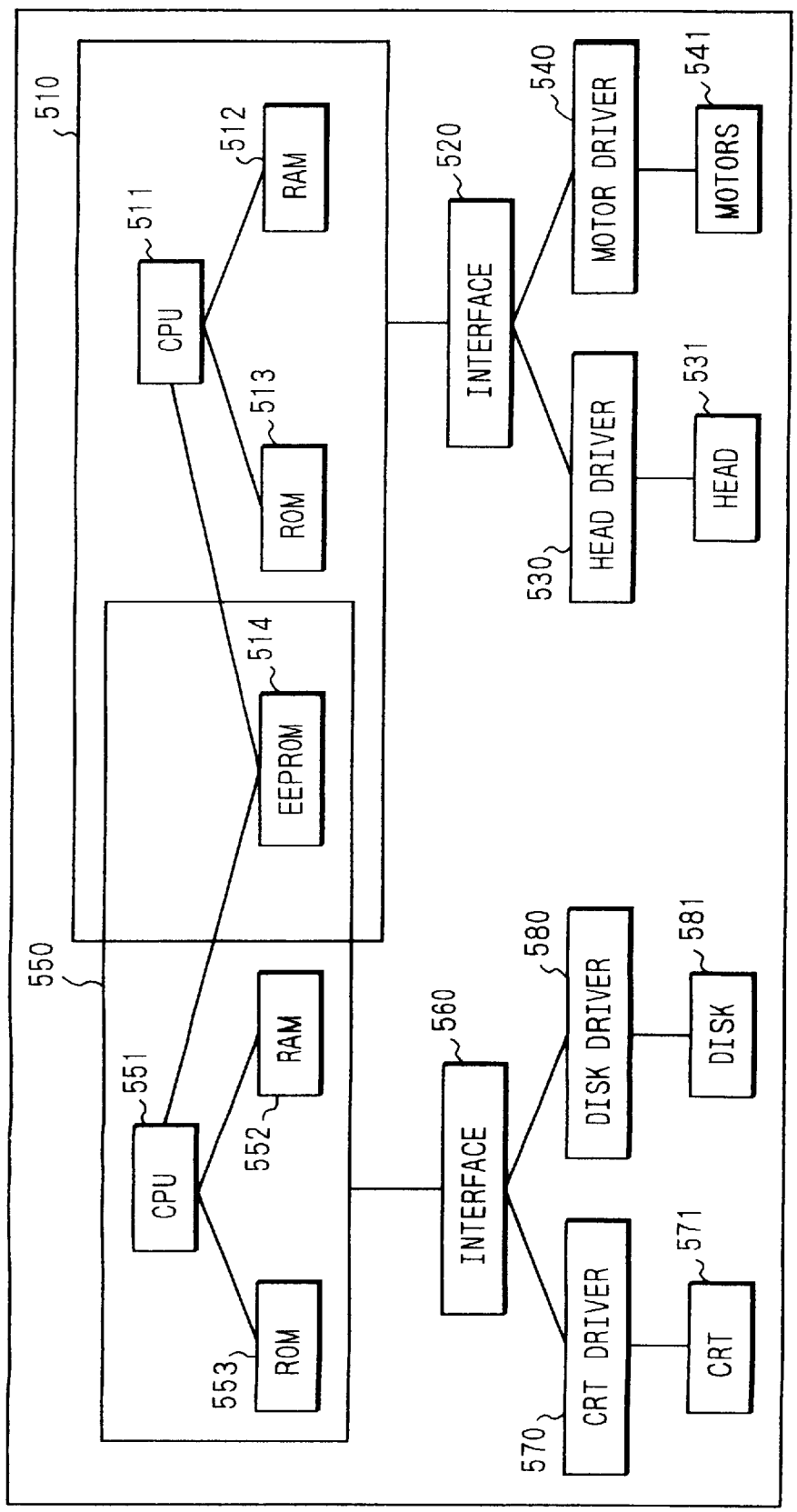
FIG. 6 is a block diagram of the control systems for a host/printer-integrated construction.

FIG. 6 is a block diagram of control systems for driving the members of a printer and host. As shown in FIG. 6, the control system of the printer comprises a control unit 510 including a CPU 511 realized with, for example, a microprocessor, a ROM 513 containing the control programs of the CPU and various data, and a RAM 512 serving as a work area of the CPU 511 and storing various data temporarily, and an interface 520, a motor driver 540 for driving motors, and a driver 530 for driving a recording head 531. On the other hand, the control system of the host comprises a control unit 550 including a CPU 551 realized with, for example, a microprocessor, a ROM 553 containing the control programs of the CPU 551 and various data, and a RAM 552 serving as a work area of the CPU 551 and storing various data temporarily, an interface 560, a disk driver 580 for driving a recording medium, and a driver 570 for driving a CRT. The control systems are completed with an EEPROM 514 that can be referenced by the control unit of the printer or of the host and that can store various head information even after the power supply is turned off for replacement of a head.

Figure 10:
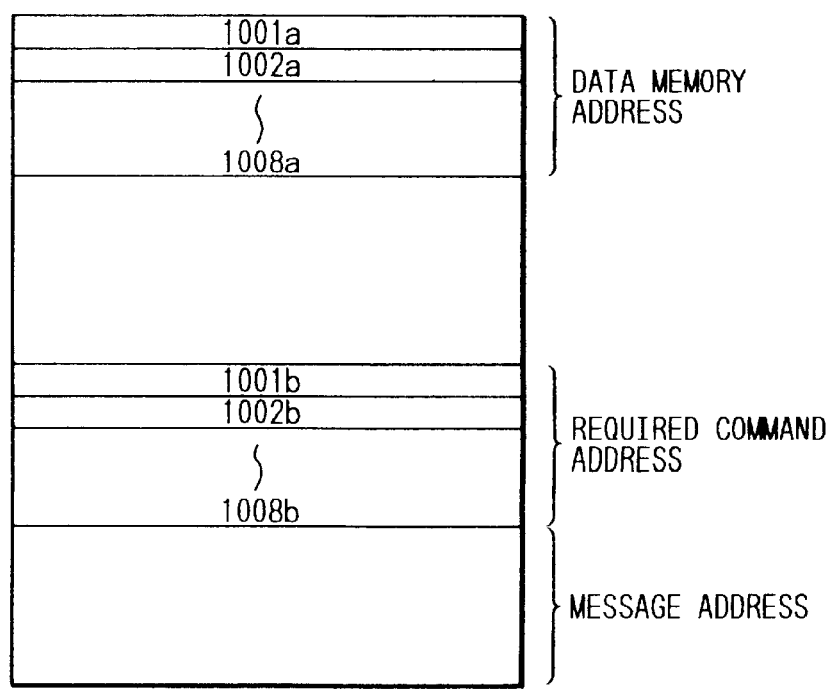
FIG. 10 is an area map of a storage element.

FIG. 10 shows a memory map of an EEPROM 514. In this embodiment, similarly to the previous embodiment, printer information that a host must reference includes the following eight items:

1. Tank replacement time (amount of remaining ink)
2. Chip replacement time
3. Amount of ink discharged by suction
4. Font currently selected
5. Recording speed mode currently selected
6. Display of "Suction is under way"
7. Display of "Aging"
8. Display of "Suction"

In an EEPROM 514, a rewritable storage element, that can be referenced by both a host and a printer and can contain information even after the power supply is turned off, data memory addresses (1001*a* to 1008*a*) dedicated for storing the information of the above eight items are allocated in one-to-one correspondence with the items. The printer updates the printer information existent at specified addresses according to predetermined timing to be described later. After completing update of information, the printer writes the data indicating completion of update at a message address. Herein, printer information are written at request command addresses (1001b to 1008b), and stored at the data memory addresses (101a to 1008a).

On the other hand, the host looks at the data written at the message address at regular intervals. When the host becomes aware that information has been updated, the host references the EEPRONL 514, fetches required printer information, and handles the information (displays the information on a CRT).

The printer updates information according to the timing identical to that in the previous embodiment.

The components and operation of this embodiment are identical to those of the previous embodiment, excluding the construction that a printer and a host are integrated and a memory means both the printer and host can reference is installed. The description will, therefore, be omitted.

(Embodiment 3)

Next, an invention regarding a recovery procedure performed when a recording head or an ink tank is replaced will be described in detail.

Figure 13:
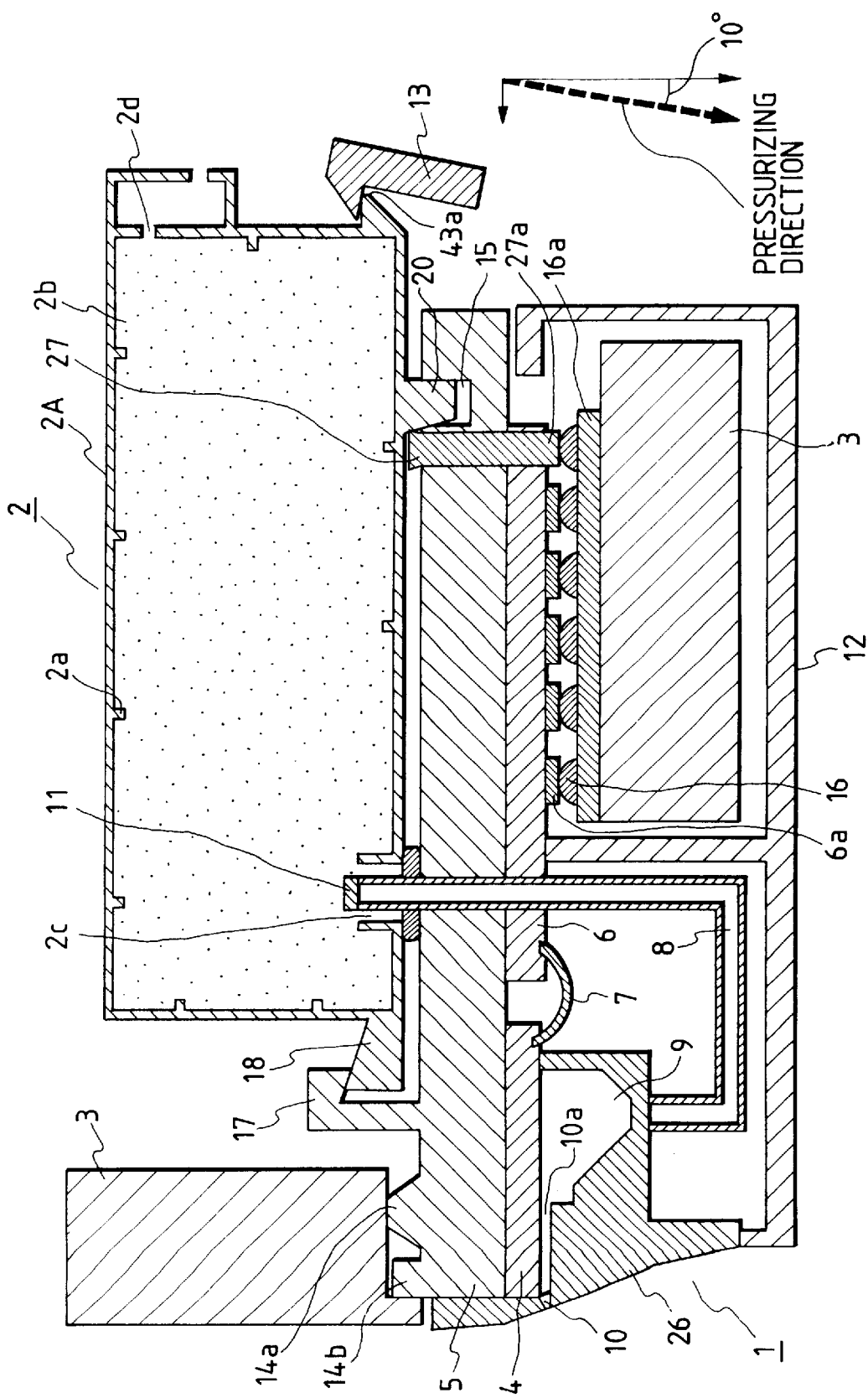
FIG. 13 is a cross-sectional diagram schematically showing a major part of an embodiment of an ink-jet recording apparatus to which a recovery method of the present invention can apply.

FIG. 13 schematically shows a cross section of a major portion of an embodiment of an ink-jet recording apparatus to which the recovery method of the present invention can apply. In FIG. 13, a recording head, an ink tank, and a carriage are united. Components identical to those in a cross-sectional diagram of Embodiment 1 are assigned the same numerals.

A recording head of this embodiment includes electrothermal transducers that generate thermal energy for use in causing film boiling of ink according to electric signals. In FIG. 13, main components of a recording head are attached or press-fitted to a head base plate 5 in a consecutive order, wherein a first projection 14a and a second projection 14b that are formed on the head base plate 5 for alignment are used as position references. On a heater board 4, heaters that are realized on a heating resistor layer with electrothermal transducers set in array on a silicon substrate, and aluminum electrodes for supplying power to the heaters are integrated using a film integration technology. The heater board 4 is joined with a head printed circuit board 6 by performing wire bonding 7 in such a manner that the wires of the heater board 4 will be associated with the wires of the head printed circuit board 6 that have pads for receiving electric signals from the main body at their ends.

A ditched top plate 26 is a polysulfone-molded unit made up of partitions for separating multiple ink passages 10a communicating with multiple jet nozzles 10 in association with the heaters and a shared chamber 9 for routing ink from an ink tank 2 through a supply path 8 to the ink passages 10a. The ditched top plate 26 is pressed with a spring that is not shown, press-fitted and fixed to the heater board 4, and sealed up using a sealing agent. Thus, an ink jet section is formed.

The connection of the recording head, ink tank, and carriage shown in FIG. 13 is identical to that in the construction of Embodiment 1 shown in FIG. 1. The description will, therefore, be omitted.

In this embodiment, a pressing shaft member 27a is penetrating through the head base plate 5 so that it will be pressed to the ink tank 2 by a pressing means that is not shown. When the ink tank 2 is immobilized using a pressurizing hook 13, the pressing shaft member 27a is pressed by a convex portion 27 of the ink tank 2 and brought in contact with an electrode 16a. This makes a circuit that is not shown. Eventually, replacement of the ink tank 2 is detected.

As described using FIG. 13, in this embodiment, a recording head and a detachable ink tank are substantially engaged with each other on a carriage, then the detachable ink tank is pressed unidirectionally. Thereby, when the carriage and recording head are reliably aligned and united with each other, the recording head and detachable ink tank are reliably united with each other at the same time. At the same time, in this embodiment, the carriage on a main body of a recording apparatus is electrically coupled with the recording head. This results in excellent operability in replacing a recording head or an ink tank. Alternatively, electrical coupling may be accomplished by connecting a connector. This improves reliability in alignment of a recording head and in connection of a detachable ink tank.

For this embodiment, a monochrome ink-jet recording apparatus having a single recording head has been described. The present invention can apply to a color ink-jet recording apparatus having multiple recording heads capable of shooting different ink jets of, for example, four colors; black, cyan, magenta, and yellow. The present invention can also apply to a single head capable of shooting multiple color ink jets. In these applications, a means for restricting the position and direction of connecting a detachable ink tank should be added.

As described previously, in this embodiment, a direction of connecting between a carriage and a recording head is substantially the same as a direction of connecting between the recording head and a detachable ink tank. Then, the recording head is connected to the carriage and to the detachable ink tank simultaneously by pressing the detachable ink tank. This results in excellent operability in replacing a recording head or a detachable ink tank. Furthermore, mechanical and electrical coupling of these components can be achieved with a simple construction.

Figure 14:
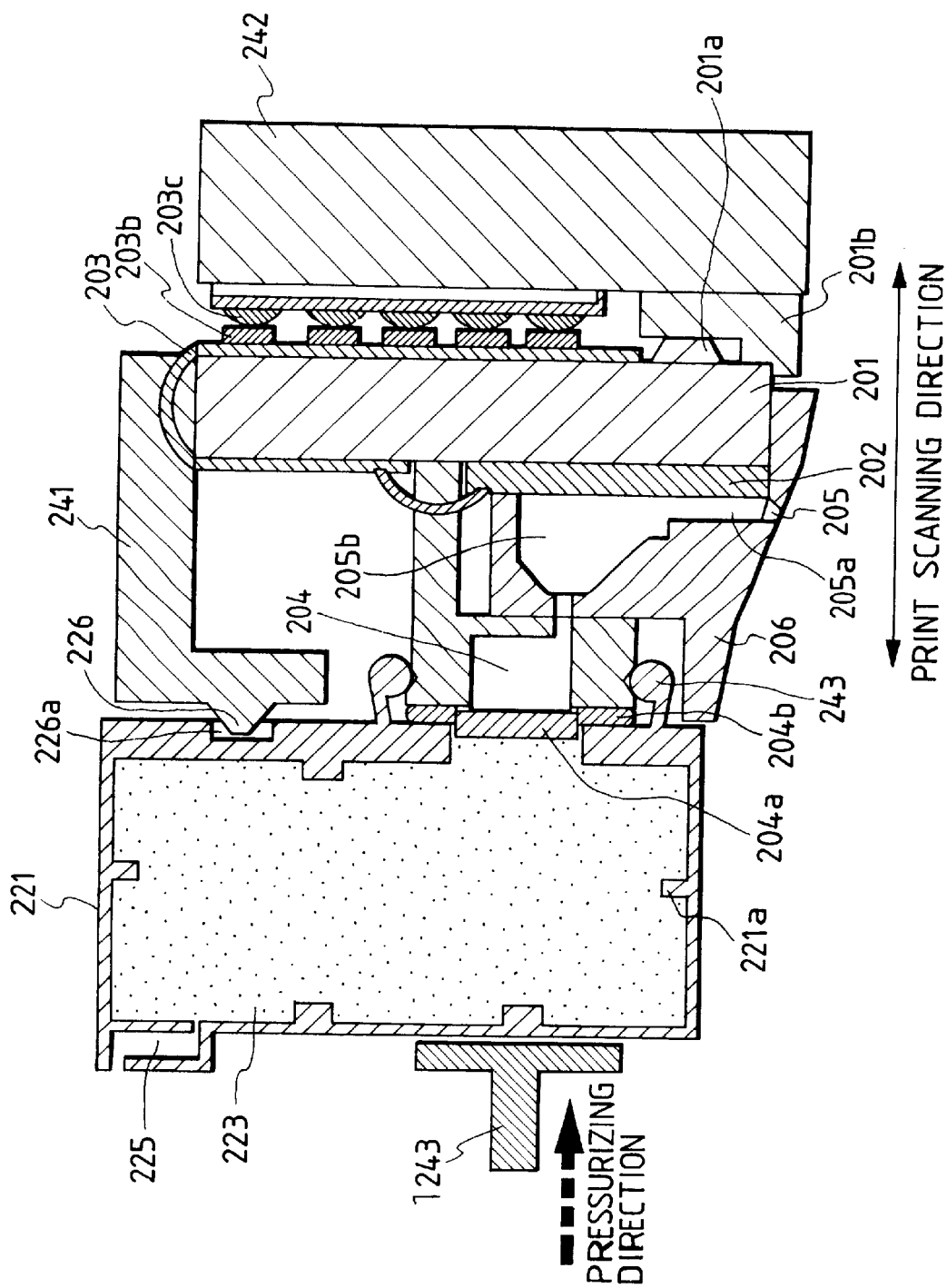
FIG. 14 is a cross-sectional diagram schematically showing a major part of another embodiment of an ink-jet recording apparatus to which a recovery method of the present invention can apply.

FIG. 14 schematically shows a cross section of a major portion of another embodiment of an ink-jet recording apparatus to which a recovery method of the present invention can apply. In FIG. 14, a recording head, an ink tank, and a carriage are united. In this embodiment, the recording head scans the top of paper while jetting ink downward. When a notch of a head base plate 201 is brought into close contact with a reference section 201b, forming a reference surface of a carriage 242 by utilizing the weight of the recording head, the recording head is aligned with the carriage 242 relative to a longitudinal direction of paper.

As shown in FIG. 14, when the pressurizing force of a pressuring member 1243 formed on the carriage 252 works on the recording head via a detachable ink tank 221, a projecting reference surface 201a of the recording head is pressed to be in contact with the reference section 201 forming the reference surface of the carriage. Thus, the recording head is aligned in the print scanning direction.

Electrical coupling in this embodiment, similarly to that in the previous embodiment, is achieved when pads 203b on a head flexible sheet 203 are pressed to be in contact with head drive electrodes 203c on the carriage 242 with the pressurizing force transmitted via the detachable ink tank 221. However, in this embodiment, electric wires leading to the recording head are arranged on the flexible sheet of high flexibility, and provided as the pressing pads 203b on the plane of the head base plate 201 on the opposite side of the jet section of the recording head. Therefore, the reliability of the connection is higher than that in the previous embodiment in which a recording head is slightly turned and mounted. Furthermore, a reference projection (not shown) for alignment is installed in the vicinity of the electrode section on the back of the head base plate 201. This prevents the recording head from being mounted askew. Moreover, an elastic member that is moderately thick and highly elastic is placed as an underlying layer of the head drive electrodes 203c, so that adequate pressing force will occur between the flexible sheet 203 and head drive electrodes 203c even at the time of pressing the reference projection. This realizes more reliable electrical coupling. Thus, in this embodiment, the pressurizing force working on the recording head via the detachable ink tank 221 is absorbed by the reference projections formed on the front and back of the head base plate 201.

A supply path 204 in this embodiment, unlike the one in an embodiment of FIG. 13, is formed immediately above a chamber 205b, and joined with the detachable ink tank 221 on the side of the jet section of the head base plate 201. Since the supply path 204 need not penetrate through the head base plate 201, the supply path 205 can be designed to be short in length and large in diameter. This results in a smaller flow resistance than that in the previous embodiment. Furthermore, a pressure loss occurring when ink is supplied to the recording head is so small that a recording frequency can be further increased. Pressurizing force occurring when the detachable ink tank 221 and recording head are united is likely to work on an ink jet section via the supply path 204. In this embodiment, therefore, the mechanical strength of a supply path formation member is increased, and the supply path 204 is directly fixed to the head base plate 201. The sealing of the joint between the supply path 204 and chamber 205b is accomplished by applying a sealing agent. The recording head of this embodiment is constructed by placing a heater board 202 and a ditched top plate 206 on the head base plate 201 in that order. Therefore, it is preferred that the pressurizing force transmitted via the detachable ink tank 221 be regulated to be a proper pressure and used to reinforce the force for connecting the heater board 202, ditched top plate 206, and head base plate 201.

Next, attachment or detachment of a recording head or a detachable ink tank of this embodiment will be described. The recording head and detachable ink tank 221 of this embodiment can be attached or detached to or from each other even when they are dismounted from a recording apparatus. A supplementary means may be installed to facilitate attachment or detachment to or from a carriage.

The recording head and detachable ink tank 221 are mounted using a tank guide 226 and engagement guides 243 of the ink tank. The tank guide 226 has a function of substantially restricting rotation of the detachable ink tank 221 on the recording head and possesses a backlash so as not to intervene in a connection between the ink supply path 204 and engagement guides 243.

The connection of the ink supply path is achieved by fitting the elastic and deformative engagement guides 243 formed on the detachable ink tank 221 into dents formed on a supply path formation member that is held by the head base plate 201 of the recording head. For this connection, the tips of the engagement guides 243 are rounded. In this embodiment, three engagement guides (one of which is not shown) are provided, and fitted to an engagement section of the cylindrical supply path formation member at three points. The number of engagement guides may be more than three. Alternatively, a single cylinder may be employed as an engagement guide. The engagement section of the cylindrical supply path formation member may not be cylindrical.

The elastic connection force of each engagement guide 243 is not very strong for easy detachment; that is, is strong to such an extent that the recording head and detachable ink tank 221 can be handled in a united body during replacement. A recording head and a detachable ink tank, which are substantially united, are mounted on a carriage in a main body of a recording apparatus as shown in FIG. 14. As described previously, the alignment reference of the recording head is engaged with the head alignment section of the carriage 242, then the detachable ink tank 221 is pressurized in the arrow direction of FIG. 14 using a pressurizing means 1243 formed on the carriage. When the detachable ink tank 221 is pressurized, the recording head is press-fitted and fixed to the carriage 242. Thus, the recording head and detachable ink tank are united completely.

As shown in FIG. 14, the engagement guides 243 of the detachable ink tank are inserted beyond the dents on the supply path formation member. Thereby, a filter 204a at the end of the supply path 204 is brought into close contact with an ink absorbent 221a in the ink tank, enabling supply of ink. A ring seal 204b deforms elastically until the outer wall of the detachable ink tank is brought into contact with the top of the end of the supply path 204. This perfectly seals the ink supply section to prevent direct communication of the air with the inside of the ink tank. Even in this state, the tank guide 226 has a sufficient space in the direction of connecting the recording head and detachable ink tank, so that unnecessary force will not work on the ink supply section. From this viewpoint, if the detachable ink tank is shaped like a cylinder and the direction of connecting the detachable ink tank on the recording head is designed to be freely changeable (rotatable), a tank guide becomes unnecessary.

As described above, in this embodiment, the direction of connecting a carriage and a recording head is exactly identical to the direction of connecting the recording head and a detachable ink tank. Therefore, when the detachable ink tank is pressed, the recording head is connected to the carriage and to the detachable ink tank simultaneously. This results in excellent operability in replacing the recording head and detachable ink tank. Furthermore, mechanical and electrical coupling therebetween can be achieved with a simple construction. Moreover, a recording head and a detachable ink tank can be substantially united even when they are not mounted on a carriage. This further facilitates handling efficiency during replacement.

Figure 15:
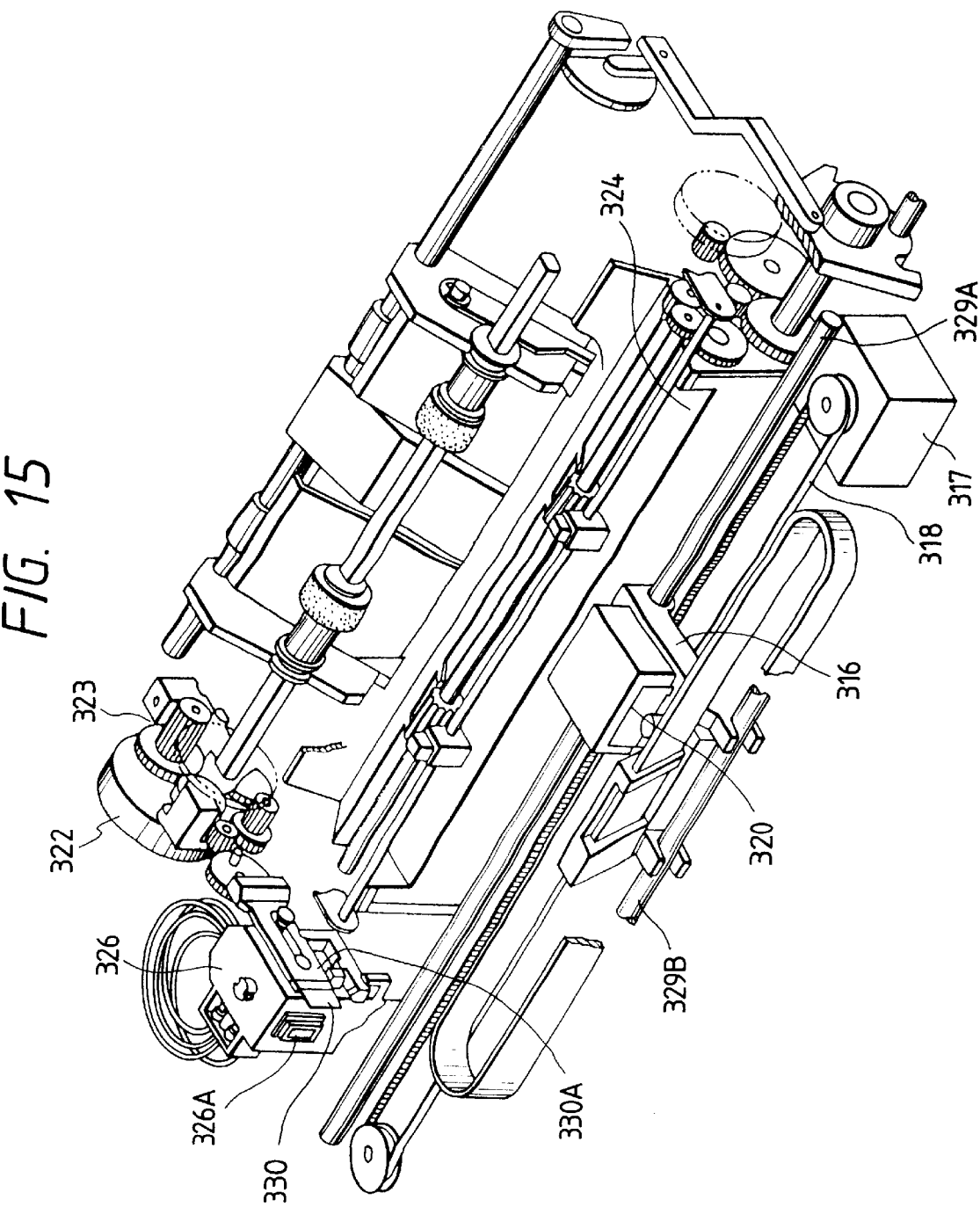
FIG. 15 is an oblique view schematically showing a major part of an example of an ink-jet recording apparatus.

An example of an ink-jet recording apparatus having an ink-jet recording head of the aforesaid embodiment will be described in conjunction with FIG. 15. FIG. 15 is an oblique diagram schematically showing a major portion of an example of an ink-jet recording apparatus. In FIG. 15, 320 denotes a head/ink tank separable/detachable type ink-jet cartridge head. The ink-jet cartridge head 320 has multiple ink jet nozzles facing a recording surface of recording paper (not shown) carried onto a platen 324. 316 denotes a carriage on which the ink-jet recording head 320 is mounted. The carriage 316 is linked to part of a driving belt 318 for transmitting the driving force of a drive motor 317. The carriage 316 can slide along two guide shafts 329A and 329B that are in parallel with each other. Thereby, the ink-jet recording head 320 can reciprocate across the whole width of recording paper.

326 denotes a recovery device that recovers the ink-jet recording head 320 from an ink jet failure or prevents occurrent of the ink jet failure. The recovery device 326 is located on the opposite side of a home position or other given position within a moving range of the ink-jet recording head 320. The recovery device 326 caps the jet nozzles of the ink-jet recording head 320 using the driving force of a motor 322 that is transmitted via a transmission mechanism 323. When a cap 326A of the recovery device 326 caps the jet nozzles of the ink-jet recording head 320, an adequate suction means (not shown) incorporated in the recovery device 326 sucks ink from the jet nozzles, or an adequate pressurizing means (not shown) installed in an ink supply path leading to the ink-jet recording head distributes ink with pressure. Thereby, recovery is carried out; ink is discharged from the jet nozzles forcibly, and thickened ink and other foreign matters are removed from the insides of the jet nozzles.

330 denotes a blade serving as a wiping member that is arranged on the side of the recovery device 326 and made of silicon rubber. The blade 330 is cantilevered by a blade support member 330A and driven by the motor 322 and transmission mechanism 323 similarly to the recovery device 326. Thereby, for example, the blade 330 is projected to a moving range of the ink-jet recording head 320 at an adequate time while the ink-jet recording head 320 is operating for recording or after the recovery device 326 completes recovery. Consequently, as the ink-jet recording head 320 moves, the blade 330 wipes off steam condensed on, ink leaked out of, or dust and other foreign matters accumulated on the surfaces of the jetnozzles of the ink-jet recording head 320.

The drive of a recording paper transport means, a carriage, and a recovery device in the ink-jet recording apparatus, or the drive of a recording head is controlled according to a command or signal issued by a control means including a CPU in a main body of the recording apparatus.

The construction and electric circuits of an information processor in which the aforesaid recording apparatus is incorporated will be described.

FIG. 16 is an oblique view schematically showing an appearance of an information processor 604 in which a recording apparatus is incorporated. In FIG. 16, 601 denotes a printer described previously. 602 denotes a keyboard having keys used to enter characters and numerals, and keys used to issue various commands. 603 denotes a display unit having a display.

Figure 17:
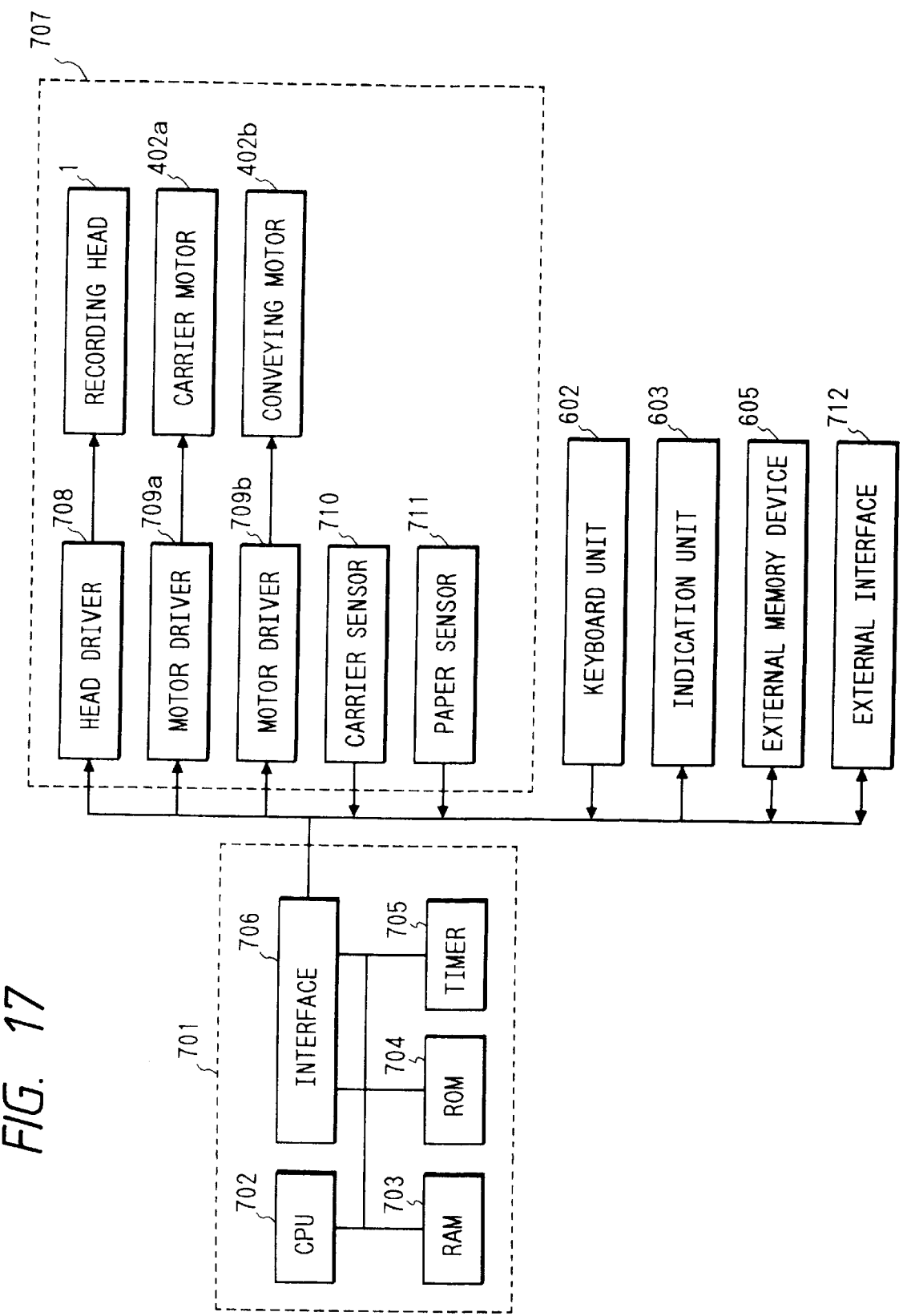
FIG. 17 is a block diagram showing a construction of electric circuits for an information processor in which a recording apparatus is incorporated.

FIG. 17 is a block diagram showing a construction of electric circuits of an information processor in which a recording apparatus is incorporated.

In FIG. 17, 701 denotes a controller serving as a main control unit. 702 denotes a CPU that executes a certain protocol and is realized with, for example, a microcomputer. 703 denotes a RAM having an area for developing text data or image data and a work area. 704 denotes a ROM containing programs based on the protocol, and fixed data including font data. 705 denotes a timer that measures time to indicate an execution cycle or the timing of a recording operation to be performed by the printer 601. 706 denotes an interface for feeding signals from the CPU 702 to peripheral equipment.

707 denotes a controller of the printer 601. 708 denotes a head driver for transmitting recording signals or power to the head cartridge 201. 709a and 709b denote motor drivers that output signals and power necessary for driving a carrier motor 402a and a conveying motor 402b respectively. 710 denotes a carrier sensor for detecting the position of the carrier 202 and checking whether or not the carrier 202 stays at, for example, a home position. 711 denotes a paper sensor that detects presence of a recording medium 6 so that recording will not be validated when no recording medium is inserted or a recording operation has come to the end of a page.

605 denotes an external storage; such as, an FDD, HDD, or RAM card. 712 denotes an external interface that communicates with other information processor or controls peripheral equipment when directly connected to an internal bus.

A power supply unit for supplying power to the foregoing electric circuits, which is not shown in the block diagram of FIG. 17, is installed. The power supply unit is, for example, a rechargeable battery, a detachable dry battery, or an AC power converter for use when the main body of the information processor is immobilized for use.

Next, a recovery sequence for stabilizing ink jets to be implemented in an ink-jet recording apparatus on which an ink tank separable type head cartridge is mounted will be described.

An ink tank separable type head cartridge to which the present invention can apply is disassembled into an ink tank and a head as shown in FIG. 13. The head is provided with electrothermal transducers for generating thermal energy for use in jetting ink. When the ink tank is connected to the head, ink is supplied from the ink tank.

Figure 18:
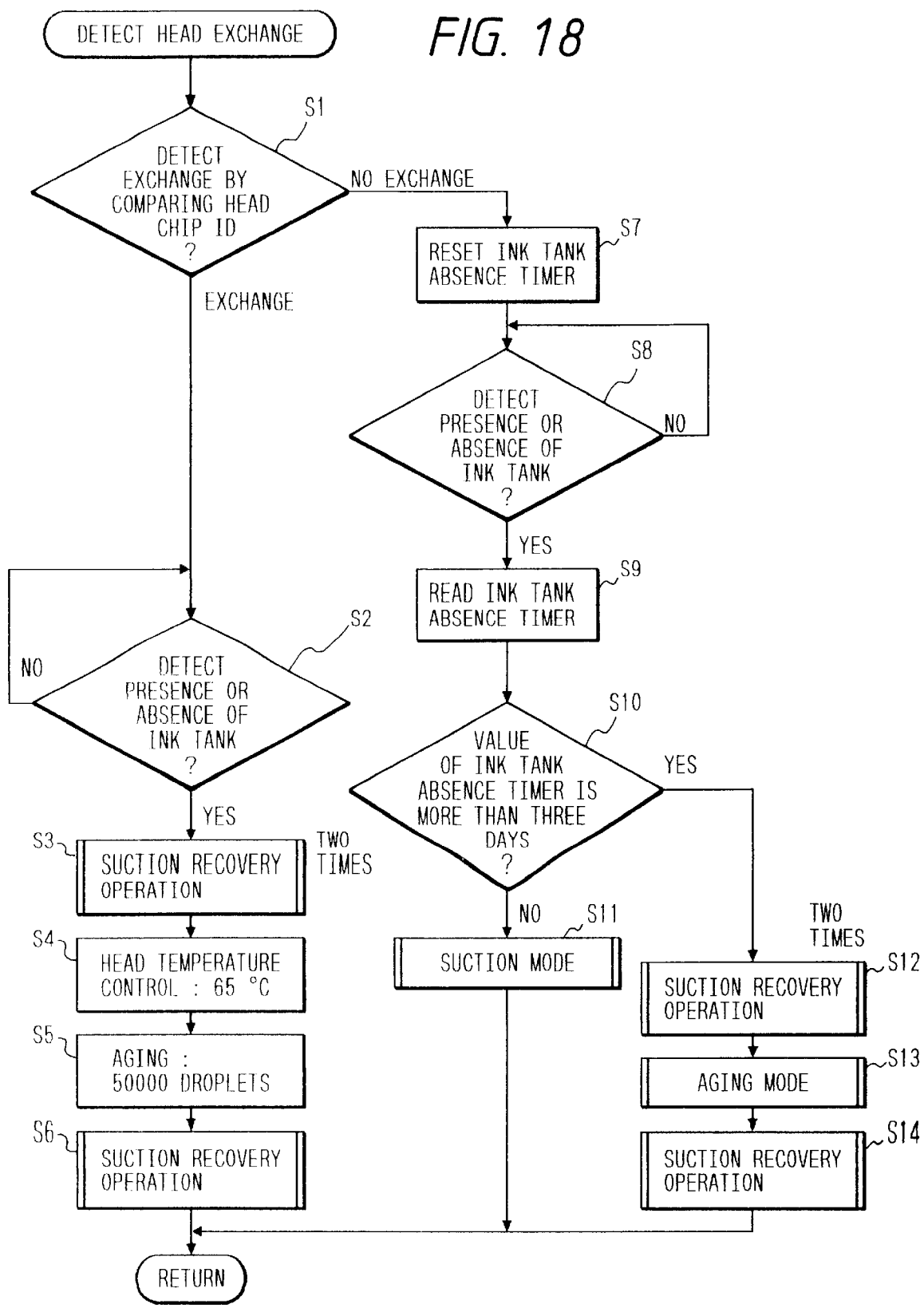
FIG. 18 is a flowchart showing a recovery sequence of an embodiment of the present invention.
Figure 19:
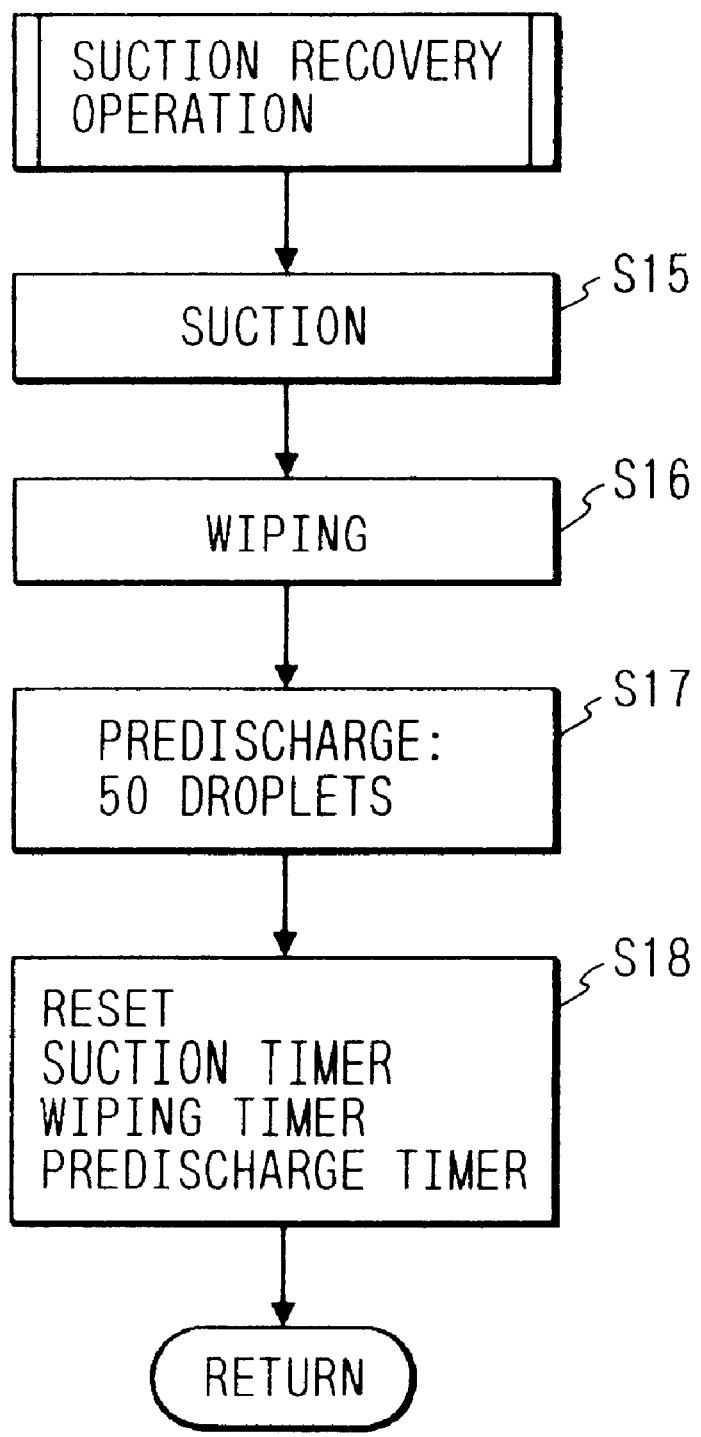
FIG. 19 is a flowchart showing a recovery sequence of other embodiment of the present invention.

In this embodiment, when an ink tank separable type head is recovered, a recovery sequence used to stabilize ink jets is varied depending on whether or not the head has been replaced. FIG. 18 is a flowchart showing a recovery sequence of this embodiment.

First, at a step S1, a head chip ID is compared with stored data to detect whether or not a head has been replaced. Whether or not a head has been replaced should be detected, especially, when the power supply is turned on or printing is started. Whether or not the head (which may be referred to as a head chip, hereafter) has been replaced is determined by comparing the data in a detected portion (which may be referred to as an ID, hereafter), which is, for example, a nonvolatile memory incorporated in the head chip, with stored data. If no head chip is mounted on a main body of a recording apparatus, a user is informed of the fact and prompted to mount a head chip.

Next, at a step S2, it is checked if an ink tank is mounted. When a convex portion (numeral 27 in FIG. 13), which stands at any place other than a tank guide of the ink tank and hits an aluminum base plate, presses a pressing shaft member (numeral 27a in FIG. 13) that is penetrating the base plate, the pressing shaft member is brought into contact with a head drive electrode (numeral 16a in FIG. 13) of a carriage. Thereby, presence of an ink tank is detected.

If no ink tank is mounted, the system is placed in a standby state until an ink tank is mounted. When an ink tank is mounted, a recovery procedure of steps S3 to S6 is executed.

At a step S3, a suction recovery procedure is repeated twice so that the head chip will be filled with ink without fail. Furthermore, at a step S4, head temperature control is executed so that so-called aging will be performed efficiently. During head temperature control, a sub-heater located in the vicinity of a shared chamber is used to heat the head chip up to 65° C. Next, at a step S5, 50000 supplementary jets are shot for aging. A heater in a newly mounted head chip is sometimes contaminated. Therefore, the aging is performed to stabilize ink jets.

At a step S6, a suction recovery procedure is executed to cool the head chip and provide uniform ink jets. When the temperature of the head becomes almost equal to an ambient temperature and ink jets get stable, a series of recovery operations terminates. If the temperature of the head does not approach an ambient temperature soon, a delay time may be set.

Next, a sequence to be performed when it is found at a step S1 that a head has not been replaced will be described. When a head chip ID is compared with stored data at a step S1, if it is confirmed that a head chip has not been replaced, control passes to a step S7 before presence or absence of an ink tank is detected. At the step S7, a "no-ink tank timer" is reset. Then, at a step S8, it is detected whether or not an ink tank is present. The employment of the no-ink tank timer makes it possible to estimate to what extent dryness and stickiness of the junction between a head chip and an ink tank or of a chamber in the head chip, or contamination of a heater due to air, which is attributable to the fact that the system has been left intact with an ink tank unmounted, has made progress.

After it is detected whether or not an ink tank is present, when it is confirmed that an ink tank is mounted, a value indicated by the no-ink tank timer (tank unmounted time) is read at a step S9. Then, a recovery sequence is executed according to the reading.

At a step S10, the value of the no-ink tank timer is checked. If the timer value is less than 72 hours, a suction mode of a step S11 is activated. In the suction mode of the step S11, a table of Table 1 is referenced to set a frequency of suction recovery according to a tank unmounted time during which the system is left intact with an ink tank unmounted.

If it is found at the step S10 that the no-ink tank timer indicates 72 hours or more, it is predicted that the heater is contaminated by the air because the system has been left intact for a prolonged period of time. Steps S12, S13, and S14 are proceeded to execute a recovery procedure including aging. Within the recovery procedure, suction recovery is repeated twice at the step S12 so that the heat chip will be filled with ink. Then, the aging mode is activated at the step S13.

In the aging mode activated at the step S13, a table of Table 2 is referenced to set the number of preliminary jets required for proper aging according to an unused time during which the system has been left intact with an ink tank unmounted. The number of preliminary jets for aging is set to a very small value in a bid to extend the service life of the head chip, which is, however, not true for aging to be performed at the time of replacement of a head chip.

As described previously, when an ink tank separable type head is to be recovered, a recovery procedure is optimized depending on whether or not a head has been replaced. This permits stable jets.

(Embodiment 4)

As for this embodiment, similarly to Embodiment 3, an example of a recovery sequence to be performed when an ambient temperature is high will be discussed.

In FIG. 18, if an ink tank is replaced at a high ambient temperature, it is presumed that dryness or stickiness of the junction between a head chip and the ink tank or of a shared chamber in the head chip, or contamination of a heater due to the air, which is attributable to the fact that the system has been left intact with an ink tank unmounted, has progressed to a great extent. Since an amount of suction becomes higher than usual at a high temperature, when a recovery procedure must be executed at a high temperature, it is preferred that a frequency of suction be reduced to avoid waste of ink and that the number of preliminary jets for aging be increased.

Figure 20:
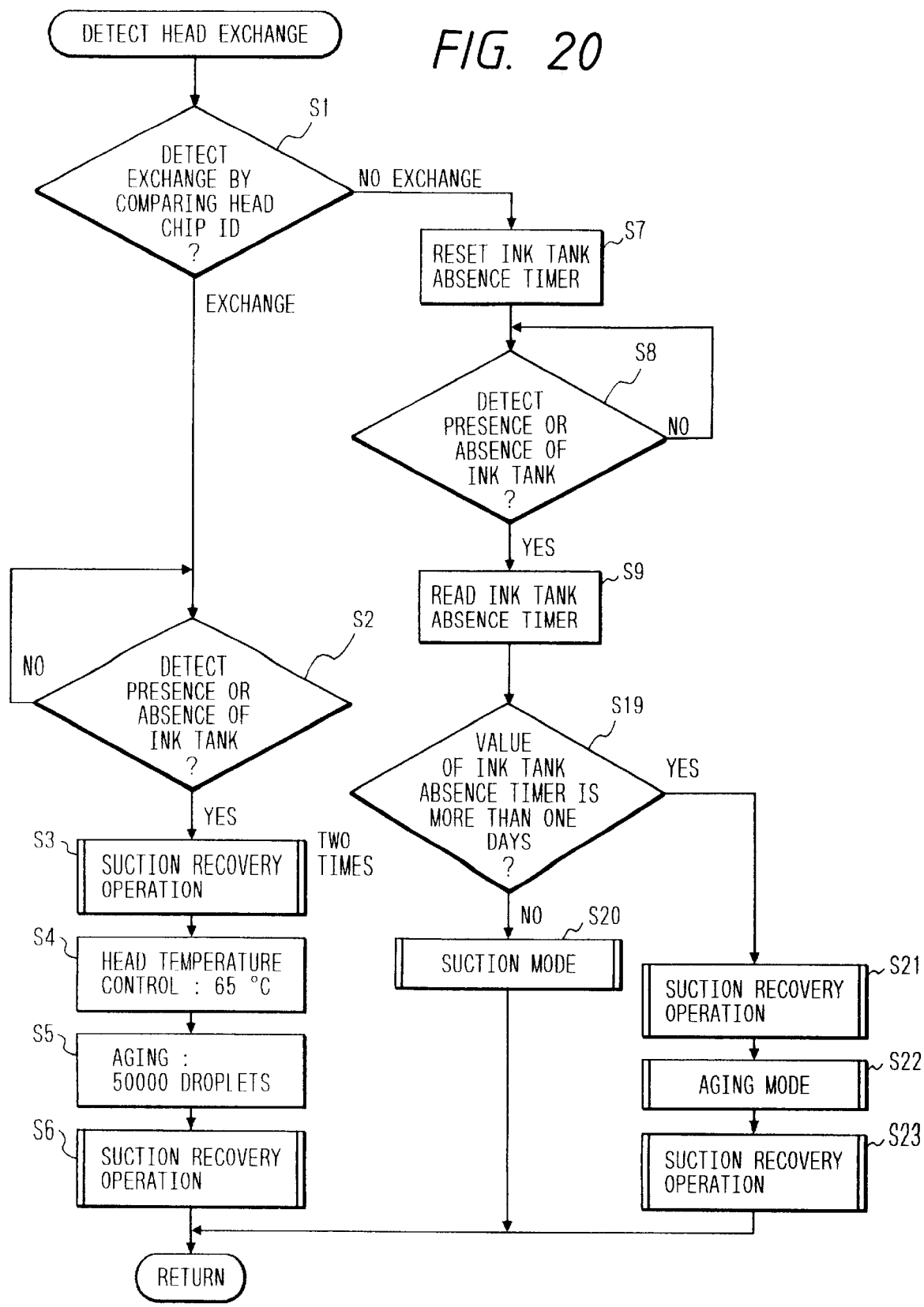
FIG. 20 is a flowchart showing a recovery sequence of other embodiment of the present invention.

FIG. 20 shows a recovery sequence to be performed at a high ambient temperature. If it is found at a step S19 that the reading of a no-ink tank timer is less than 24 hours, a table of Table 3 is referenced to activate a suction mode at a step S20. If the reading of the no-ink tank timer is 24 or more hours, a recovery procedure of steps S21, S22, and S23 is executed. In aging mode of a step S22, a table of Table 4 is referenced to set the number of preliminary jets according to the reading of the no-ink tank timer and the ambient temperature.

In the aforesaid construction, a recovery sequence is performed according to the state of a system at a high ambient temperature. Thereby, a change in volume of a cylinder of a suction pump is varied to provide an amount of suction suitable for an ambient temperature. This avoids an increase in an amount of suction at a high temperature and eventually reduces waste of ink.

(Embodiment 5)

Next, an embodiment to be performed when an ink tank has been replaced multiple times to affect durability of a head chip will be described. When an ink tank has been replaced multiple times with the same head chip in use, the durability of the head chip may be affected adversely. In this case, an amount of ink jetted for any purpose other than printing is modified to maximize the service life of the head chip.

In this embodiment, an ink tank replacement frequency is written in a nonvolatile memory installed in a head in aging mode activated according to a recovery sequence shown in FIG. 18 every time an ink tank is replaced, and the number of preliminary jets for aging is varied depending on the replacement frequency. The numbers of preliminary jets for aging listed in a table of Table 5 are identical to those in a table of Table 2 as far as the ink tank replacement frequency is less than three. Thereafter, as the replacement frequency increases, the number of preliminary jets decreases. The ink tank replacement frequency written in the nonvolatile memory is reset when a head chip is replaced. The initial value is 1, which is incremented.

The number of preliminary Jets for aging is decreased as mentioned above. This ensures a long service life for a head chip even when an ink tank is replaced multiple times.

In this embodiment, an ink tank replacement frequency written in a nonvolatile memory may let a user know a head chip replacement time. For example, when the ink tank replacement frequency exceeds ten, ERROR appears to prompt a user to replace a head chip. Moreover, a wiping frequency may be written in the nonvolatile memory to inform a user of a head chip replacement time. For example, when the wiping number exceeds 50000, ERROR appears to prompt a user to replace a head chip. This prevents continuation of printing in a state in which a vaporizable material layer is peeled off from the jet-nozzle surface of a head due to excess wiping, and avoids a printing failure due to ink leakage at the jet-nozzle surface of a head.

TABLE 1

Suction mode table

| Reading of the no-ink tank timer (hour) | Suction recovery frequency |
| --- | --- |
| not less than 0 and less than 1 | 2 |
| not less than 1 and less than 24 | 3 |
| not less than 24 and less than 72 | 4 |

TABLE 2

Aging mode table

| Reading of the no-ink tank timer (hour) | Number of preliminary jets for aging |
|---|---|
| not less than 72 and less than 168 | 5,000 |
| not less than 168 and less than 336 | 10,000 |
| not less than 336 and less than 720 | 20,000 |
| not less than 720 | 50,000 |

TABLE 3

Suction mode table at a high ambient temperature

| Reading of the no-ink tank timer (hour) | Suction recovery frequency |
|---|---|
| not less than 0 and less than 12 | 1 |
| not less than 12 and less than 24 | 2 |

TABLE 4

Aging mode table at a high ambient temperature

| Reading of the no-ink tank timer (hour) | Ambient temperature (° C.) | | |
|---|---|---|---|
| | not less than 25 and less than 30 | not less than 30 and less than 35 | not less than 35 |
| not less than 24 and less than 72 | 1,000 | 2,000 | 3,000 |
| not less than 72 and less than 168 | 5,000 | 7,500 | 10,000 |
| not less than 168 and less than 336 | 15,000 | 17,500 | 20,000 |
| not less than 336 and less than 720 | 25,000 | 30,000 | 35,000 |
| not less than 720 | 50,000 | 50,000 | 50,000 |
| | (number of preliminary jets) | | |

TABLE 5

Aging mode table for a durable head chip

| Reading of the no-ink tank timer (hour) | Frequency of replacing an ink tank (times) | | | |
|---|---|---|---|---|
| | 3 or less | 4 | 5 | 5 or more |
| not less than 72 and less than 168 | 5,000 | 4,000 | 3,000 | 2,000 |
| not less than 168 and less than 336 | 10,000 | 8,000 | 6,000 | 4,000 |
| not less than 336 and less than 720 | 20,000 | 17,500 | 15,000 | 12,500 |
| not less than 720 | 50,000 | 40,000 | 30,000 | 20,000 |
| | (number of preliminary jets) | | | |

Now, a method of detecting and identifying a state in which a new ink tank and a new head are mounted will be described. Unless a recording head causes a recording failure, the recording head and an ink tank will not be dismounted from a printer normally. From this viewpoint, a method of recognizing a remounted ink tank or head as a new one is acceptable. However, an ink tank or head may be detached frequently during operation. A method of identifying such an ink tank or head will be discussed.

When a remaining ink detecting means, which may be an electrode installed in an ink tank, or a remaining ink detecting means that checks the number of ink jets detects that an ink tank replacement time has come, the ink tank is replaced with a new one. When recording is enabled after replacement, an operator turns on a Reset key. Thereby, it is recognized that an ink tank has been replaced with a new one. With the on signal, an ink tank replacement frequency counter is actuated. After the replacement frequency has reached a given value, when it is detected again that an ink tank replacement time has come, it is recognized that not only the ink tank but also a head should be replaced. Then when the ink tank and head are replaced, initialization is carried out. This method is suitable for such an ink supply method that an ink tank container is reused to supply ink.

In other method, an electric resistor that breaks after multiple times of electrical conduction is installed in an ink tank. A new ink tank is identified with one time of conduction. After that, the resistor is broken by conducting electricity multiple times. Thereby, it is recognized that an ink tank is in use or has been used up. Every time an ink tank is replaced with a new one, an ink tank replacement frequency counter is actuated. After the replacement frequency has reached a given value, when it is re-detected that an ink tank replacement time has come, it is recognized that not only the ink tank but also a head should be replaced. Then, after the ink tank and head have been replaced, initialization is carried out.

Figure 21:
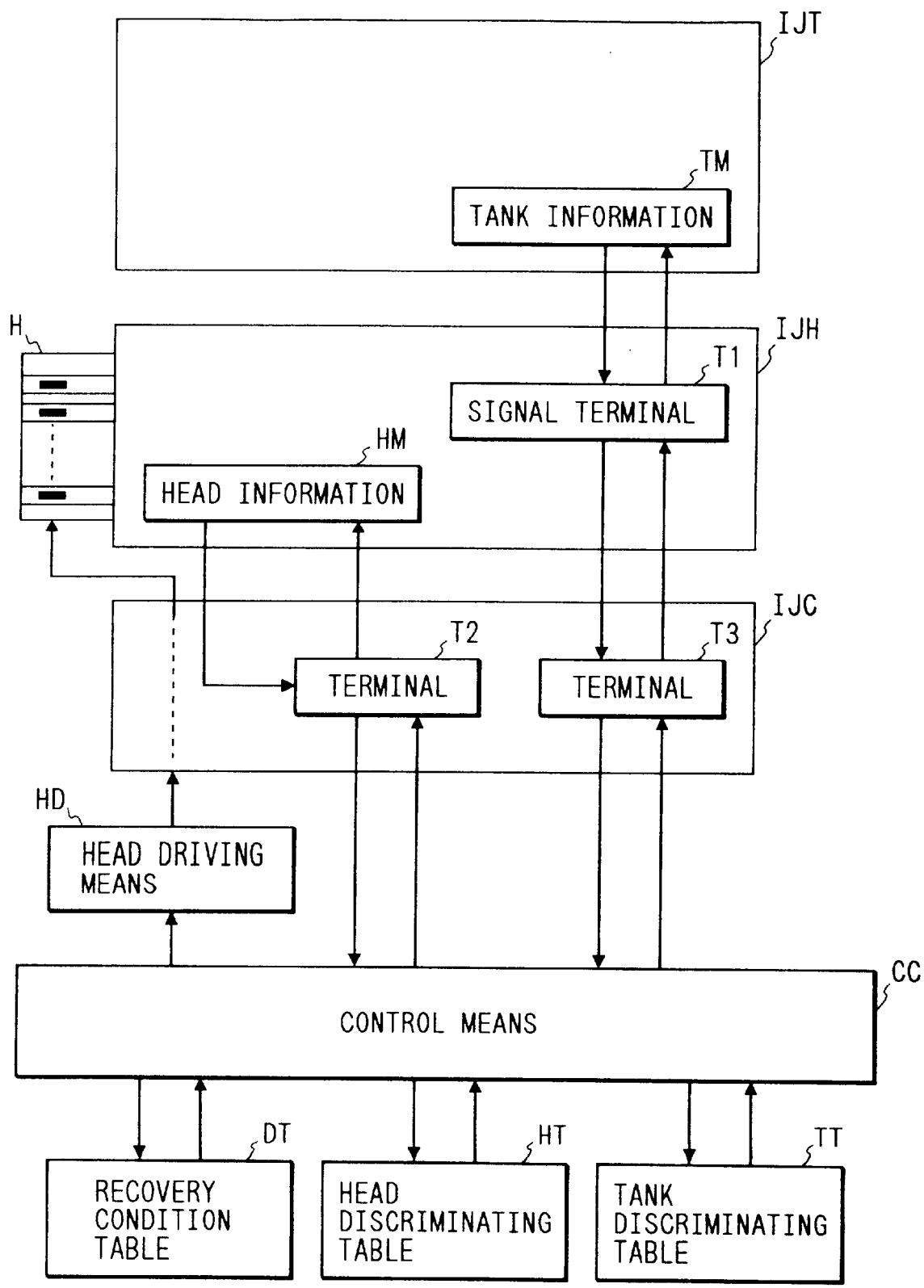
FIG. 21 is a block diagram for explaining a mechanism that detects and recognizes a state after an ink tank or head has been replaced with a new one.

FIG. 21 shows a particularly effective method. FIG. 21 is a block diagram showing a method in which a head IJH and an ink tank IJT contain their own information, and the information are checked properly using independent electrical transmission paths. Tank information TM includes data of a precedence indicating when the tank is to be mounted in the head IJH. The data is provided as an electric signal, different arrangements of electrical contacts, or a resistance. The tank information TM is preferably contained in a ROM having recovery conditions. The tank information TM passes through a signal terminal T1 of the head IJH and a terminal T3 of a carriage IJC and reaches a control means CC. The control means CC references a discriminating table contained in a tank discriminating table TT to determine whether the ink tank IJT is mounted on the head IJH and when the ink tank is put to use. In case that the control means CC pre-sets ink tank information concerning an ink tank to be mounted during replacement of an ink tank, the validity of transmitted ink tank information can be determined merely by comparing the transmitted ink tank information with the pre-set information. If the transmitted ink tank information agrees with the pre-set information, the control means CC adopts the information.

Head information HM contained in an area (which is preferably realized with a writable memory in which the number of used ink tanks can be written) of the head IJH is transmitted to the control means CC via a terminal T2 of the carriage IJC. Then, the control means CC references a discriminating table contained in a head discriminating table HT to check the information of the head IJH. Based on the ink tank information and head information, the control means CC selects optimal driving conditions from a recovery condition table DT. Then, the control means CC controls, for example, a head driving means HD so that a recovery procedure will be executed under the selected optimal recovery conditions.

A place in which an ink tank or a head is replaced may be a so-called home position. Preferably, the replacement place should be restricted to a place off the home position; such as, the vicinity of the center of a carriage scanning range. The underlying reason is that a recovery mechanism including a cap is usually installed at the home position and that the recovery mechanism may intervene in replacement or stain hands.

The present invention is particularly advantageous when implemented in an ink-jet recording head or ink-jet recording apparatus that uses thermal energy provided by electrothermal transducers or a laser beam to change the state of ink or shoot ink jets. The implementation of the present invention permits high-density picture elements and enables high-resolution recording.

A typical construction and principles of operation, which are disclosed in U.S. Pat. Nos. 4,723,129 and 4,740,796, can apply to either a so-called on-demand type recording apparatus or continuous type recording apparatus. The construction and principles are, however, more advantageous to the on-demand type recording apparatus. This is attributable to the principles. That is to say, at least one driving signal is sent to electrothermal transducers placed in ink passages. Electrothermal transducers to which driving signals are fed generate thermal energy to heat ink. Thereby, the temperature of ink rises quickly to exceed a nucleation boiling point. Thus, film boiling occurs in a heating surface of a recording head. Then, an ink bubble is formed with each driving signal. In the course of formation, development, and contraction of bubbles, ink is Jetted through jet nozzles to produce at least one ink droplet. The driving signal is preferably a pulse signal, so that a bubble can be developed and contracted in synchronization with each pulse. This enables prompt shooting of ink jets. A driving signal is disclosed as a pulse signal in U.S. Pat. Nos. 4,463,359 and 4,345,262. U.S. Pat. No. 4,313,124 discusses a temperature rise rate in a heating surface.

A construction of a recording head is shown in U.S. Pat. Nos. 4,558,333 and 4,459,600. In the patent publications, a heating surface is referred to as a bent portion. A construction of a unit made up of jet nozzles, ink passages, and electrothermal transducers is also described in the above patent publications. The present invention can apply to a construction disclosed in Japanese Patent Application Laid-Open No. 59-123670. In the application No. 59-123670, a common slit is used instead of jet nozzles having electrothermal transducers. The present invention can also apply to a construction disclosed in Japanese Patent Application Laid-Open No. 59-138461. In this application, an opening for absorbing a pressure wave of thermal energy is formed on the opposite side of jet nozzles. Thus, the present invention enables reliable and highly efficient recording irrespective of a type of recording head.

The present invention can apply to a so-called full-line type recording head whose length corresponds to a maximum recording width. Such a recording head comprises, for example, multiple recording heads to cover the maximum recording width.

Furthermore, the present invention can apply to a serial type recording head that is fixed to a main unit, to a chip detachable type recording head that is electrically coupled with a main unit and provided with ink when mounted on the main unit. The present invention can also apply to a cartridge type recording head having an integral ink container.

It is preferred that a recovery means or any other supplementary means be incorporated to perform a preliminary operation. With the incorporation, the advantages of the present invention will be further exploited. The supplementary means may be a capping means or a cleaning means for a recording head, a pressing or sucking means, a preliminary heating means which may be electrothermal transducers, an additional heating element, or a combination thereof. Incorporation of a means for effecting preliminary jets (which are not intended for recording) will result in stable recording performance.

A single detachable recording head may be employed to shoot ink jets of a single color. Alternatively, multiple recording heads may be employed to shoot ink jets of different colors or densities. The present invention can apply to a system that supports a monochrome mode using black, a multi-color mode using ink of different colors and/or a full-color mode using a mixture of colors. In such a system, multiple recording heads are integrated to form a recording unit.

In the embodiments of the present invention, ink is liquid. Ink may be of such a type that is solidified below a room temperature and liquefied at the room temperature. The ink is controlled in a temperature range from 30° C. at lowest to 70° C. at highest, so that the viscosity of ink will remain stable to stabilize ink jets. Other type of ink is liquid and responsive to the recording data of the present invention within the above temperature range. In this type of ink, a temperature rise due to thermal energy is efficiently prevented because ink changes its state from solid to liquid by consuming the thermal energy. Other type of ink is solidified when it is left intact. This property is helpful in preventing vaporization of ink. Whatever type of ink is employed, thermal energy is generated according to recording data, then ink is liquefied to provide ink jets. Alternatively, ink may be of such a type that is solidified when it is brought into contact with a recording medium. The present invention can also apply to such a type of ink that is liquefied by application of thermal energy. This type of ink remains liquid or solid when it stays in through holes or recesses formed on a porous sheet, which has been disclosed in Japanese Patent Application Laid-Open No. 54-57847 and Japanese Patent Application Laid-Open No. 60-71260. The porous sheet is placed to face electrothermal transducers. A film boiling type is the most effective type of ink.

An ink-jet recording apparatus may be used as an output terminal of an information processor that is realized with, for example, a computer. When used in combination with, for example, an image reader, the ink-jet recording apparatus operates as a copying system or a facsimile system having information transmitting/receiving functions.

The present invention has been described with reference to the constructions disclosed herein. The present invention is not restricted to any specific construction. It will be apparent that modifications or changes can be made without departing from the spirit and scope of the invention described in the appended claims.

What is claimed is:

1. An ink-jet recording apparatus for performing recording using an exchangeable ink-jet recording head portion having a plurality of discharge ports for discharging ink and an exchangeable ink tank for storing ink to be supplied to said ink-jet recording head portion, said ink-jet recording head portion and said ink tank being exchangeable separately from each other, said apparatus comprising:

suction recovery means for performing suction recovery by sucking the ink from said plurality of discharge ports;

preliminary discharge means for performing preliminary discharge recovery by discharging the ink multiple times from said plurality of discharge ports;

head replacement detecting means for detecting whether or not said ink-jet recording head portion has been exchanged;

recovery control means for performing plural recovery operations by controlling said suction recovery means to perform the suction recovery and said preliminary discharge means to perform the preliminary discharge recovery; and temperature detecting means for measuring an ambient temperature, wherein different recovery operations are performed when an output of said head replacement detecting means indicates that said ink-jet recording head portion has been exchanged and when only said ink tank has been exchanged, a frequency of recovery of said suction recovery means or of said preliminary discharge means is changed according to the temperature detected by said temperature detecting means, the frequency of the suction recovery by said suction recovery means decreases as the temperature detected by said temperature detecting means increases, and said recovery control means controls said suction recovery means to perform a predetermined suction recovery to decrease a temperature of the recording head after said preliminary discharge means performs the preliminary discharge recovery following the suction recovery.

2. An ink-jet recording apparatus according to claim 1, wherein:

said ink-jet recording head portion further includes a shared chamber for temporarily storing the ink to be supplied to said plurality of discharge ports, and a sub-heater for heating the ink in said shared chamber; and said sub-heater heats the ink in said shared chamber during the preliminary discharge recovery by said preliminary discharge means.

3. An ink-jet recording apparatus according to claim 1, wherein the number of preliminary jets to be shot by said preliminary discharge means increases as a temperature detected by said temperature detecting means increases.

4. An ink-jet recording apparatus for performing recording using an exchangeable ink-jet recording head portion having a plurality of discharge ports for discharging ink and an exchangeable ink tank for storing ink to be supplied to said ink-jet recording head portion, said ink-jet recording head portion and said ink tank being exchangeable separately from each other, said apparatus comprising:

suction recovery means for performing suction recovery by sucking the ink from said plurality of discharge ports;

preliminary discharge means for performing preliminary discharge recovery by discharging ink multiple times from said plurality of discharge ports;

head replacement detecting means for detecting whether or not said ink-let recording head portion has been exchanged;

recovery control means for controlling said suction recovery means to perform the suction recovery and said preliminary discharge means to perform the preliminary discharge recovery when an output of said head replacement detecting means indicates that said ink-let recording head portion has been exchanged; and timer means for measuring a time for which said ink tank has been unmounted, wherein when said head replacement detecting means does not detect exchange of said ink-jet recording head portion, both of the preliminary discharge recovery and the suction recovery are varied depending on the time indicated by said timer means.

5. An ink-jet recording apparatus according to claim 4, wherein:

when the time measured by said timer means is shorter than a given time, the suction recovery by said suction recovery means is executed alone; and the suction recovery by said suction recovery means is executed multiple times according to the time measured by said timer means.

6. An ink-jet recording apparatus according to claim 5, wherein the suction recovery by said suction recovery means is executed a plurality of times in proportion to the time measured by said timer means.

7. An ink-jet recording apparatus according to claim 5, wherein:

when the time measured by said timer means is longer than said given time, the suction recovery by said suction recovery means and the preliminary discharge recovery by said preliminary discharge means are executed simultaneously; and a number of times ink is discharged from said plurality of discharge ports is varied depending on the time measured by said timer means.

8. An ink-jet recording apparatus according to claim 5, wherein a number of times ink is discharged from said plurality of discharge ports increases in proportion to the time measured by said timer means.

9. An ink-jet recording apparatus for performing recording using an ink-jet cartridge in which an ink-jet recording head having a plurality of jet nozzles for jetting ink and a separable and detachable ink tank for storing the ink to be supplied to said ink-jet recording head are provided, said apparatus comprising:

suction recovery means for performing suction recovery by sucking the ink from said plurality of jet nozzles;

preliminary jet means for achieving preliminary jet recovery by jetting the ink multiple times from said plurality of jet nozzles;

head replacement detecting means for detecting whether or not said ink-jet recording head has been replaced;

recovery control means for varying recovery of said suction recovery means or of said preliminary jet means depending on an output of said head replacement detecting means; and memory means for storing a frequency of replacing said ink tank, wherein a number of times ink is jetted from said plurability of jet nozzles is changed in inverse proportion to the frequency of replacing said ink tank without replacing said ink-jet recording head.

10. An ink-jet recording apparatus according to claim 9, wherein said memory means is reset to an initial value every time said ink-jet recording head is replaced.

11. A method of recovering an ink-jet recording apparatus that uses an ink-jet cartridge in which a head having a plurality of jet nozzles for jetting ink and a separable and detachable ink tank for storing the ink to be supplied to the head are provided, said method comprising:

a replacement detecting step of detecting whether or not the head has been replaced;

a first recovery step at which recovery is executed when it is detected at said replacement detecting step that the head has been replaced;

a time detecting step at which time for which the ink tank has been separated is detected when replacement of the head is not detected at said replacement detecting step; and a second recovery step of executing recovery that has been varied depending on the time detected at said time detecting step.

12. A method of recovering an ink-jet recording apparatus according to claim 11, further comprising a temperature detecting step of detecting an ambient temperature of the ink-jet cartridge, said second recovery step being varied depending on the temperature detected at said temperature detecting step.

13. A method of recovering an ink-jet recording apparatus that performs recording an exchangeable ink-jet recording head having a plurality of discharge ports for discharging ink and an exchangeable ink tank for storing the ink to be supplied to the recording head portion, said recording head portion and said ink tank being exchangeable separately from each other, and that includes suction recovery means for performing suction recovery by sucking ink from the plurality of discharge ports, and preliminary discharge means for performing preliminary discharge recovery by discharging the ink multiple times from the plurality of discharge ports, said method comprising:

a detecting step of detecting exchange of ink-jet recording the head portion;

a recovery step at which when the exchange of the ink-jet recording head portion is detected at said detecting step, the suction recovery means executes the suction recovery and the preliminary discharge means executes the preliminary discharge recovery; and an ink tank separated time detecting step at which, when the exchange of the ink-jet recording head portion is not detected at said detecting step, a time for which the ink tank has been separated is detected, both of the suction recovery and the preliminary discharge recovery being varied depending on the time detected at said ink tank separated time detecting step.

14. A method of recovering an ink-jet recording apparatus according to claim 13, wherein when the time detected at said ink tank separated time detecting step is shorter than a given time, said the suction recovery means performs suction recovery at a frequency varied according to the detected time.

15. A method of recovering an ink-jet recording apparatus according to claim 13, wherein:

when the time detected at said ink tank separated time detecting step is longer than a given time, the suction recovery means performs the suction recovery and the preliminary discharge means performs the preliminary discharge recovery; and a number of times ink is discharged from the plurality of discharge ports is varied depending on the detected time.

16. A method of recovering an ink-jet recording apparatus according to claim 13, wherein the number of times ink is discharged from the plurality of discharge ports increases as the detected time increases.

17. An ink-jet recording apparatus, recording by using a replaceably mountable ink-jet recording head having a plurality of discharge ports for discharging ink and an ink container replaceably mounted to said ink-jet recording head, the ink container storing ink to be supplied to said ink-jet recording head, the apparatus comprising:

suction recovery means for sucking ink from said plurality of discharge ports in order to recover a discharging state of said ink-jet recording head;

preliminary discharge control means for controlling an exhaust of ink by discharging from said ink-jet recording head during a period different from a recording operation in order to recover a discharging state of said ink-jet recording head;

discriminating means for discriminating a type of ink-jet recording head from among plural different types of ink-jet recording heads, based on the ink-let recording head mounted in said ink-jet recording apparatus; and recovery control means for executing recovery by using said suction recovery means and said preliminary discharge control means at a predetermined timing, wherein said recovery control means judges whether said ink-jet recording head is replaced or not by discriminating the type of said ink-jet recording head by said discriminating means, and further differentiates an amount of ink to be exhausted by said suction recovery means and said preliminary discharge control means between a case that said ink-jet recording head is replaced and a case that said ink-jet recording head is not replaced based on a judged result.

18. An ink-jet recording apparatus according to claim 17, wherein said predetermined timing includes time when a power supply of the apparatus is turned on and when recording is initiated.

19. An ink-jet recording apparatus according to claim 17, wherein said ink-jet recording head further includes a shared chamber for temporarily reserving ink to be supplied to said plurality of nozzles, and a sub-heater for heating the ink in said shared chamber, and wherein said sub-heater heats the ink in said shared chamber during recovery of said preliminary discharge control means.

20. An ink-jet recording apparatus according to claim 17, wherein said recovery control means combines and executes recovery by said preliminary discharge means and recovery by a plurality of times of recovery by said suction recovery means in a case that said recovery control means judges that said ink-jet recording head is replaced.

21. An ink-jet recording apparatus according to claim 17, further comprising ink container detecting means for detecting whether said ink container is mounted or not, wherein said recovery control means controls recovery based on a result detected by said ink container detecting means in a case that said recovery control means judges that said ink-jet recording head is not replaced.

22. An ink-jet recording apparatus according to claim 21, further comprising timer means that measures time for which said ink container has been unmounted in accordance with the result of said ink container detecting means, wherein said recovery control means differentiates recovery according to time measured by said timer in a case that said recovery control means judges that said ink-jet recording head is not replaced.

23. An ink-jet recording apparatus according to claim 22, wherein, when the time measured by said timer means is shorter than a given time, recovery of said suction recovery means is executed alone, and wherein said recovery of said suction recovery means is executed multiple times according to the time measured by said timer means.

24. An ink-jet recording apparatus according to claim 23, wherein recovery of said suction recovery means is executed many times in proportion to the time measured by said timer means.

25. An ink-jet recording apparatus according to claim 23, wherein, when the time measured by said timer means is longer than said given time, recovery of said suction recovery means and recovery of said preliminary jet means are executed simultaneously, and wherein a number of discharge by said preliminary discharge control means is varied depending on the time measured by said timer means.

26. An ink-jet recording apparatus according to claim 25, wherein a number of discharges by aid preliminary discharge control means increases in proportion to the time measured by said timer means.

27. An ink-jet recording apparatus according to claim 17, further comprising a temperature detecting means for measuring an ambient temperature, wherein a frequency of recovery of said suction recovery means or of said preliminary discharge control means is changed according to the temperature detected by said temperature detecting means.

28. An ink-jet recording apparatus according to claim 27, wherein a frequency of recovery of said suction recovery means decreases as the temperature detected by said temperature detecting means increases.

29. An ink-jet recording apparatus according to claim 27, wherein a number of discharges by said preliminary discharge control means increases as the temperature detected by said temperature detecting means increases.

30. An ink-jet recording apparatus according to claim 17, further comprising a memory means for storing a frequency of replacing said ink container, wherein a number of discharges by said preliminary discharge control means is changed in inverse proportion to a frequency of replacing said ink tank without replacing said ink-jet recording head.

31. An ink-jet recording apparatus according to claim 30, wherein said memory means is reset to an initial value every time said ink-jet recording head is replaced.

32. An ink-jet recording apparatus according to claim 17, wherein said ink-jet recording head includes an electrothermal converting element for applying thermal energy to ink and thermal energy generated by said electrothermal converting element generates a bubble in ink to discharge ink from said discharge ports.

33. A method of recovery for an ink-jet recording apparatus for recording by using a replaceable mountable ink-jet recording head having a plurality of discharge ports for discharging ink and an ink container replaceably mounted to said ink-jet recording head, the ink container storing ink to be supplied to said ink-jet recording head, in which the apparatus comprises suction recovery means for sucking ink from said plurality of discharge ports in order to recover a discharging state of said ink-jet recording head, and preliminary discharge control means for controlling an exhaust of ink by discharge from said ink-jet recording head during a period different from a recording operation in order to recover the discharging state of said ink-jet recording head, the method comprising:

a discriminating step for discriminating whether said ink-jet recording head is mounted at a predetermined timing;

a judging step for judging whether said ink-jet recording head is replaced or not based on a result of discrimination of said ink-jet recording head; and a recovery step for executing recovery by differentiating an amount of ink to be exhausted by said suction recovery means and said preliminary discharge control means based on the result judged at said judging step between whether an ink-jet recording head is replaced and whether an ink-jet recording head is not replaced.

34. A method of recovery control according to claim 33, wherein said recovery step judges a mounting state of said ink container and executes recovery by an amount corresponding to said mounting state of said ink container in a case that said judging step judges that the ink-jet recording head is not replaced.

35. A method of recovery control according to claim 34, wherein a mounting state of said ink container is a time said ink container is not mounted.

36. A method of recovery control according to claim 33, wherein said predetermined timing includes a moment when a power supply of the apparatus is turned on and a moment when printing is initiated.

37. A method of recovery control according to claim 33, further comprising the step of detecting an ambient temperature of said ink-jet recording head, said recovery step differentiating an amount of ink to be exhausted by recovery according to a temperature detected at said temperature detecting step.

38. A method of recovery control according to claim 33, wherein said ink-jet recording head includes an electrothermal converting element for applying thermal energy to ink and thermal energy generated by said electrothermal converting element generates a bubble in ink to discharge ink from said discharge ports.

39. An apparatus according to claim 17, wherein said discriminating means discriminates on the basis of an ID of said ink-jet recording head.

40. A method according to claim 33, wherein said discriminating step is performed on the basis of an ID of said ink-jet recording head.

* * * * *

UNITED STATES PATENT AND TRADEMARK OFFICE
CERTIFICATE OF CORRECTION

PATENT NO. : 6,050,669
DATED : April 18, 2000
INVENTOR(S) : Kentaro Yano, et al.

It is certified that error appears in the above-identified patent and that said Letters Patent is hereby corrected as shown below:

Title page:
Please change the title to read -- METHOD OF CONTROLLING AN INK-JET RECORDING APPARATUS ACCORDING TO RECORDING HEAD INFORMATION, AND INK-JET RECORDING APPARATUS IN WHICH THE METHOD IS IMPLEMENTED --.

Abstract:
Line 2, change "Jetting" to -- jetting --.

Column 1:
Line 2, change "ACCORDING TO" to -- ACCORDING TO RECORDING HEAD INFORMATION, AND INK-JET --;
Line 14, change "Ink" to -- ink --;
Line 15, change "is to" to -- to --;
Line 41, change "a running" to -- the operating --;
Line 47, change "ink-jetrecording" to -- ink-jet recording --;
Line 49, change "ink-jetrecording" to -- ink-jet recording --;
Line 54, change "programs-for" to -- programs for --;
Line 61, change "ink-jet recording" to -- ink-jet recording --.

Column 2:
Line 35, delete "to";
Line 39, delete "in";
Line 44, change "In" to -- in --;
Line 61, change "Ink" to -- ink --;
Line 62, change "In" to -- in --.

Column 3:
Line 4, change "ink-jetrecording" to -- ink-jet recording --;
Line 23, change "ink-jetrecording" to -- ink-jet recording --.

Column 4:
Line 50, change "other" to -- another --;
Line 52, change "other" to -- another --.

Column 5:
Line 66, change "Jets" to -- jets --.

UNITED STATES PATENT AND TRADEMARK OFFICE
CERTIFICATE OF CORRECTION

PATENT NO. : 6,050,669
DATED : April 18, 2000
INVENTOR(S) : Kentaro Yano, et al.

It is certified that error appears in the above-identified patent and that said Letters Patent is hereby corrected as shown below:

Column 6:
Line 10, change "roller" to -- platen roller --.

Column 7:
Line 55, change "Ink" to -- ink -- .

Column 8:
Line 64, delete "121, except for the porous body 123,";
Line 67, change "container" to -- container 121, except for the porous body 123, --.

Column 9:
Line 21, change "510" to -- 511 --.

Column 10:
Line 56, change "Jets." to -- jets. --.

Column 13:
Line 5, change "(101a)" to -- (1001a --;
Line 9, change "EEPRONL" to -- EEPROM --.

Column 16:
Line 60, change "occurrent of the" to -- the occurrence of --.

Column 17:
Line 20, change "jetnozzles" to -- jet nozzles --.

Column 20:
Line 33, change "Jets" to -- jets --.

Column 22:
Line 19, change "other" to -- another --.

Column 23:
Line 30, change "Jetted" to -- jetted --.

Column 24:
Line 37, change "No. 54-57847" to -- No. 54-56847 --.

UNITED STATES PATENT AND TRADEMARK OFFICE
CERTIFICATE OF CORRECTION

PATENT NO. : 6,050,669
DATED : April 18, 2000
INVENTOR(S) : Kentaro Yano, et al.

It is certified that error appears in the above-identified patent and that said Letters Patent is hereby corrected as shown below:

<u>Column 25:</u>
Line 62, change "ink-let" to -- ink-jet --.

<u>Column 26:</u>
Line 25, change "claim 5," to -- claim 7, --;
Line 47, change "plurability" to -- plurality --.

<u>Column 28:</u>
Line 6, change "ink-let" to -- ink-jet --.

<u>Column 29:</u>
Line 35, change "replaceable" to -- replaceably --.

Signed and Sealed this

Eleventh Day of September, 2001

*Attest:*

*Attesting Officer*

NICHOLAS P. GODICI
*Acting Director of the United States Patent and Trademark Office*